(12) United States Patent
Nowinski et al.

(10) Patent No.: US 7,756,306 B2
(45) Date of Patent: Jul. 13, 2010

(54) METHOD AND APPARATUS FOR EXTRACTING CEREBRAL VENTRICULAR SYSTEM FROM IMAGES

(75) Inventors: Wieslaw Lucjan Nowinski, Singapore (SG); Yan Xia, Matrix (SG); Aamer Aziz, Singapore (SG); Qingmao Hu, Rajawali (SG)

(73) Assignee: Agency for Science, Technology and Research, Singapore (SG)

( * ) Notice: Subject to any disclaimer, the term of this patent is extended or adjusted under 35 U.S.C. 154(b) by 919 days.

(21) Appl. No.: 10/547,441

(22) PCT Filed: Feb. 27, 2003

(86) PCT No.: PCT/SG03/00043

§ 371 (c)(1),
(2), (4) Date: Aug. 26, 2005

(87) PCT Pub. No.: WO2004/077359

PCT Pub. Date: Sep. 10, 2004

(65) Prior Publication Data

US 2006/0239519 A1     Oct. 26, 2006

(51) Int. Cl.
*G06K 9/00* (2006.01)
(52) U.S. Cl. .................................... 382/128
(58) Field of Classification Search ............. 382/100, 382/128–134; 128/922; 356/39–50; 250/455–465; 600/407–435
See application file for complete search history.

(56) References Cited

U.S. PATENT DOCUMENTS

| | | | |
|---|---|---|---|
| 4,751,643 A | 6/1988 | Lorensen et al. | |
| 5,262,945 A | 11/1993 | DeCarli et al. | |
| 5,425,368 A | 6/1995 | Brandt | |
| 5,859,891 A | 1/1999 | Hibbard | |
| 6,366,797 B1 | 4/2002 | Fisher et al. | |
| 6,430,430 B1 | 8/2002 | Gosche | |
| 2003/0068074 A1* | 4/2003 | Hahn | 382/128 |

FOREIGN PATENT DOCUMENTS

| | | |
|---|---|---|
| WO | 00/08600 A1 | 2/2000 |
| WO | 01/78005 A2 | 10/2001 |
| WO | 02/43003 A1 | 5/2002 |
| WO | 03/060827 A1 | 7/2003 |

OTHER PUBLICATIONS

Chun, Dong, Newman, T, S. "Anatomical-driven segmentation of the 3rd and 4th ventricles in MR data" Proceedings of the First Joint BMES/EMBS Conference, Atlanta, GA, USA, Oct. 13-16, 1999.*

(Continued)

*Primary Examiner*—Samir A. Ahmed
*Assistant Examiner*—Atiba O Fitzpatrick
(74) *Attorney, Agent, or Firm*—Fitch, Even, Tabin & Flannery

(57) ABSTRACT

A method and apparatus for extracting a cerebral ventricular system from images of one or more cerebral ventricular regions comprises defining multiple regions of interest (ROI) in the images, defining seed points within each ROI, growing images of ventricular regions while correcting for leakages into extraventricular space and connecting the ventricular regions grown.

53 Claims, 11 Drawing Sheets

OTHER PUBLICATIONS

A. Lundervold et al., Segmentation of Brain Parenchyma and Cerebrospinal Fluid in Multispectral Magnetic Resonance Images. IEEE Transactions on Medical Imaging, Jun. 1995, vol. 14, Issue: 2, pp. 339-349.

H. G. Schnack et al., Automatic Segmentation of the Ventricular System from MR Images of the Human Brain, NeuroImage 2001, May 2001, vol. 14, pp. 95-104.

Worth Andrew J., Makris, Nikos, Patti, Mark R., Goodman, Julie M., Hoge, Elizabeth A., Caviness, Verne S., and Kennedy, David N., Precise segmentation of the lateral ventricles and caudate nucleus in MR brain images using anatomically driven histograms, IEEE Transactions on Medical Imaging 1998, vol. 17, No. 2, pp. 303-310.

Baillard, C., Hellier P. and Barillot, C. Segmentation of 3D brain structures using level sets and dense registration, IEEE Workshop on Mathematical Methods on Biomedical Image Analysis (MMBIA 2000), pp. 94-101.

Geraud, Thierry, Brain Imaging, Automatic segemtation of brain structures in 3D MRI, http://www-sig.enst.fr/tsi/groups/TII/active, pp. 1-5.

Brummer, Marijn E., Mersereau, Russell M., Eisner, Robert L. and Lewine, Richard R. J., Automatic Detection of Brain Contours in MRI Data Sets, IEEE Transactions on Medical Imaging, vol. 12, No. 2, Jun. 1993, pp. 153-166.

Cootes, T., Taylor, C., Cooper, D.H., and Graham, J., Active shape models-their training and application, Computer Vision and Image Understanding 1995, vol. 61, No. I, pp. 38-59.

Schindewolf, Thomas, Frese, Uwe, and Meissner, Joachim, Sementierung und Volumetrie der Hirnventrikel mit MrT-Datensatzen, File:///D/xiayan/Project/Ventricle/KeepPaper/Ventrikelvolumetrie.htm, pp. 1-4.

Holden, Mark, Schnabel, Julia A., Hill, and Derek L.G., Quantifying small changes in brain ventricular volume using non-rigid registration, MICCAI 2001, pp. 49-56.

Kaus, Michael R., Warfield, Simon K., Nabavi, Arya, Black, Peter M., Jolesz, Ferenc A., and Kikinis, Ron, Automated segmentation of MR images of brain tumors, Radiology 2001, vol. 218, No. 2, pp. 586-591.

Radiology of the skull and brain, ventricles and cisterns. Eds: Newton, Thomas H. and Potts, D. Gordon, MediBooks, Great Neck, NY, pp. 3303-3315.

Radiology of the skull and brain, ventricles and cisterns. Eds: Newton, Thomas H. and Potts, D. Gordon, MediBooks, Great Neck, NY, pp. 3315-3367.

Radiology of the skull and brain, ventricles and cisterns. Eds: Newton, Thomas H. and Potts, D. Gordon, MediBooks, Great Neck, NY, pp. 3368-3400.

Radiology of the skull and brain, ventricles and cisterns. Eds: Newton, Thomas H. and Potts, D. Gordon, MediBooks, Great Neck, NY, pp. 3401-3412.

Radiology of the skull and brain, ventricles and cisterns. Eds: Newton, Thomas H. and Potts, D. Gordon, MediBooks, Great Neck, NY, pp. 3413-3428.

Radiology of the skull and brain, ventricles and cisterns. Eds: Newton, Thomas H. and Potts, D. Gordon, MediBooks, Great Neck, NY, pp. 3429-3499.

Radiology of the skull and brain, ventricles and cisterns. Eds: Newton, Thomas H. and Potts, D. Gordon, MediBooks, Great Neck, NY, pp. 3504-3522.

Radiology of the skull and brain, ventricles and cisterns. Eds: Newton, Thomas H. and Potts, D. Gordon, MediBooks, Great Neck, NY, pp. 3523-3535.

Kikinis, Ron, Shenton, Martha E., Losifescu, Dan V., McCarley, Robert W., Saiviroonporn, Pairash, Hokama, Hiroto H., Robation, Andre, Metcalf, David, Wible, Cynthia G., Portas, Chiara M., Donnino, Robert M., and Jolesz, Ferenc A., A digital brain atlas for surgical planning, model-driven segmentation, and teaching, IEEE Transactions on Visualization and Computer Graphics 1996, vol. 2, No. 3, 1996, pp. 232-241.

Wang, Yongmei and Staib, Lawrence H., Boundary finding with correspondence using statistical shape models, Proceeding IEEE conference of computer vision and pattern recognition, 1998, pp. 338-345.

Sonka, Milan, Tadikonda, Satish K., and Collins, Steve M., Knowledge-based interpretation of MR brain images, IEEE Transactions on Medical Imaging 1996, vol. 15, No. 4, pp. 443-452.

Sturm, Bernhard, Meier, Dominik, and Fisher, Elizabeth, Automated approximation of lateral ventricular shape in magnetic resonance images of multiple sclerosis patients, MICCAI 2002, pp. 483-491.

Volumetry of the Cerebral Ventricles, http://www.mevis.de/projects/volumetry/volumetry.litml, Center for Medical Diagnostic Systems and Visualisation, University of Bremen, Hahn et al., pp. 1-5.

* cited by examiner

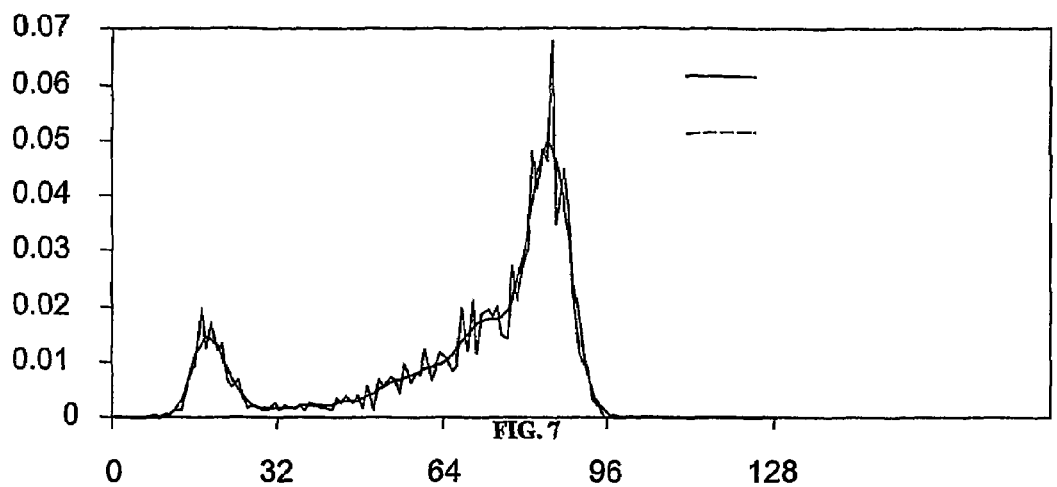
FIG. 7
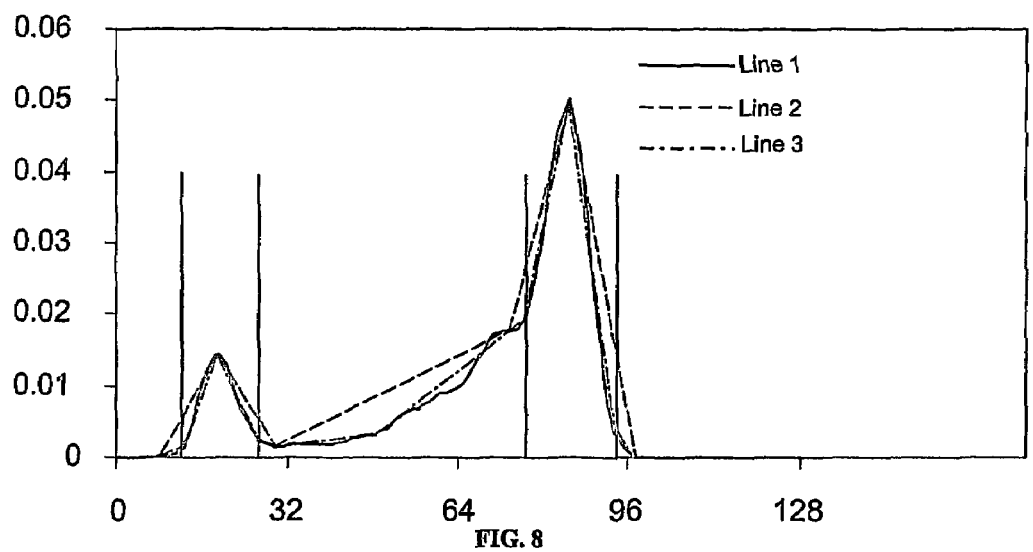
FIG. 8
FIG. 9a- V3
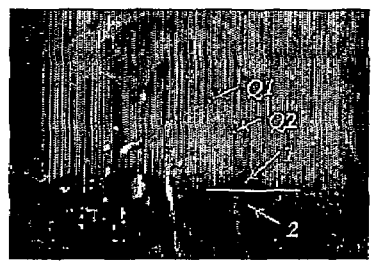
FIG. 9b –V4
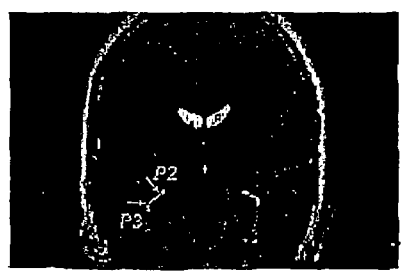
FIG. 11

METHOD AND APPARATUS FOR EXTRACTING CEREBRAL VENTRICULAR SYSTEM FROM IMAGES

FIELD OF INVENTION

The present invention relates to a method and apparatus for extracting cerebral ventricular system information from images of one or more cerebral ventricular regions. In particular, the present invention relates to extracting the human cerebral ventricular system from radiological images.

BACKGROUND OF THE INVENTION

The human cerebral ventricular system contains four intercommunicating chambers, the left lateral ventricle, the right lateral ventricle, the third ventricle, and the fourth ventricle. The ventricles contain cerebrospinal fluid (CSF) and changes in CSF volume and shape are associated with several neurological diseases such as congenital anomalies, post-traumatic disorders, pseudo-tumors, neuro-degenerative diseases, inflammatory diseases, headache, cognitive dysfunction/psychiatric diseases and post-operative changes. Quantification of the degree of dilatation of ventricles is important in the diagnosis of various diseases and for measuring the response to treatment. It may also be important in predicting the prognosis of the disease process. Therefore, extraction and quantification of the ventricular system from medical images is of primary importance.

Normally all of the ventricles are interconnected to enable circulation of cerebrospinal fluid. Hence, in an ideal case, a single region growing operation should be able to extract a complete ventricular system. In reality, however, this does not work and many factors should be taken into account such as noise, spatial and contrast resolutions of the scan. In particular, the method has to handle a partial volume effect causing "leakages" from the ventricles to the extraventricular space, and intraventricular and extraventricular pathology distorting the normal anatomy of the ventricular system.

Conventionally, the standard methods employed for investigating the human cerebral ventricular system have been ventriculography and pneumoencephalography, each of which has relatively high morbidity and mortality. With the advent of high speed Computed Tomography (CT) and three-dimensional (3D) magnetic resonance (MR) imaging (MRI), robust techniques are required to extract and quantify the ventricular system.

Due to the great importance of the ventricular system, its extraction has been the subject of extensive research work resulting in methods such as region-growing assisted by morphological operations, thresholding, template matching, atlas warping, level sets, active models, and knowledge based methods.

Schnack H G, Hulshoff P H E, Baare W F C, Viergever M A, Kahn R S, "Automatic segmentation of the ventricular system from MR images of the human brain," NeuroImage 2001 vol. 14, pp. 95-104 describes an automatic algorithm to extract the lateral and third ventricles from T1-weighted 3-D-FFE MR images of the human brain. The algorithm is based upon region-growing and mathematical morphology operators. One of the limitations of this algorithm is its dependence on the coarse binary brain segmentation image and the coarse white matter segmentation image. Although precise white matter segmentation is not necessary, precise brain segmentation is essential to ventricular system extraction. Another limitation is that it is not able to avoid inclusion of non-ventricular CSP regions although some anatomical knowledge of the ventricular system has been incorporated into the method to guide the location of the seed point(s) and searching subregions. Furthermore, the algorithm described is not able to extract the complete ventricular system as the fourth ventricle is not extracted. Several artificial boundaries are required when extracting the third ventricle resulting in some amount of manual editing needed to obtain precise results. In addition, the algorithm is time consuming to run (about 5 to 20 min on a Pentium3 450 MHz PC for a brain volume).

Worth A J, Makris N, Patti M R, Goodman J M, Hoge E A, Caviness V S, Kennedy D N, "Precise segmentation of the lateral ventricles and caudate nucleus in MR brain images using anatomically driven histograms," IEEE Transactions on Medical Imaging 1998, vol. 17, no. 2, pp. 303-310 describes an automated method to extract the lateral ventricles and caudate nucleus on T1-weighted coronal MR brain images of normal subjects. The algorithm derives, automatically, intensity thresholds from anatomical information and a histogram, and then extracts the outlines of the lateral ventricle and caudate nucleus by generating isointensity contours. The algorithm uses knowledge guided rules and methods for locating automatically certain anatomical landmarks (for example, the corpus callosum), and employs the local thresholds for extraction of the lateral ventricle and caudate nucleus. The algorithm is able to extract only the lateral ventricles in normal subjects. It needs manual editing of the resulting outlines due to irregularities in automatically generated outlines caused by the partial volume effect and low contrast. It takes about 50 minutes to extract the lateral ventricles and caudate for a brain volume data.

Kaus M R, Warfield S K, Nabavi A, Black P M, Jolesz F A, Kikinis R, "Automated segmentation of MR images of brain tumors," Radiology 2001, vol. 218, no. 2, pp. 586-591 discloses an adaptive template-moderated classification method to extract ventricles and brain tumors. The algorithm iterates statistical classification to assign labels to tissue types and non-linear registration to align a digital anatomic atlas to the patient data. Statistical classification is used to divide an image into different tissue classes on the basis of signal intensity values. If different tissues have the same or overlapping gray-value distributions, additional information about the spatial location of anatomic structures is derived from a registered anatomic atlas. As such, the algorithm is dependent on the digital atlas and is time consuming to run (5-10 minutes).

Kildnis R, Shenton M E, Losifescu D V, McCarley R W, Saiviroonporn P, Hokama H H, Robation A, Metcalf D, Wible C G, Portas C M, Donnino R M, Jolesz F A, "A digital brain atlas for surgical planning model-driven segmentation and teaching," IEEE Transactions on Visualization and Computer Graphics 1996, vol. 2, no. 3, pp. 232-241 describes an automated model-based segmentation system that uses a digital brain atlas to extract brain structure. When MR images do not provide sufficient contrast between various structures, a combination of automated and supervised segmentation methods along with the atlas information is used to define regions of interest (for example, the ventricular system) and to guide a segmentation algorithm based on neuroanatomical knowledge. The anatomical atlas is registered with classified 3D images and an elastic matching method is used for the projection of atlas information onto the data sets of subjects and patients. The resulting segmentation of the ventricular system depends on the accuracy of the digital brain atlas, and the accuracy of the matching method. The algorithm works best with images of normal subjects and is time consuming to run.

Baillard C, Hellier P, Barillot C, "Segmentation of 3D brain structures using level sets and dense registration," IEEE Workshop on Mathematical Methods on Biomedical Image Analysis (MMBIA 2000), pp. 94-101 describes a co-operative strategy for the segmentation of parts of ventricles from 3D brain MRI images which integrates 3D segmentation and 3D registration methods. The segmentation is based on the level set formalism. Using an automatic registration method to initialise the ventricular structure surface, the algorithm iteratively propagates the closed 3D surface towards the desired boundaries through the evolution of a 4D implicit function. The major limitations of this method are that it can only extract parts of ventricles and that it is time consuming.

Cootes T, Taylor C, Cooper D H, Graham J, "Active shape models—their training and application," Computer Vision and Image Understanding 1995, vol. 61, no. 1, pp. 38-59 discloses a statistical technique for building deformable shape templates and uses these models to extract various organs, including the ventricles, from 2D and 3D medical images. The statistical formulation provides global shape constraints and allows the model to deform only in ways implied by the training set. The shape of the models represent objects by sets of landmark points that are placed in the same way on an object boundary in each input image. The points can be connected to form a deformable contour. By examining the statistics of training sets of manually-labelled medical images, and using principal component analysis, a shape model is derived that describes the average positions and the major models of variation of the object points. New shapes are generated using the mean shape and a weighted sum of the major modes of variation. Object boundaries are then extracted using this "point distribution model" by examining a region around each model point to calculate the displacement required to move it towards the boundary. These displacements are then used to update the shape parameter weights. There are several problems with this approach. The technique is sensitive to the initial position of the atlas, that is, if the initial rigid alignment is off by too much, the elastic match may perform poorly. The presence of neighbouring features may also cause matching problems, for example, the atlas may warp to an incorrect boundary. Without user interaction, the atlas can have difficulty converging to complicated object boundaries.

Wang Y, Staib L H, "Boundary finding with correspondence using statistical shape models," Proceeding IEEE conference of computer vision and pattern recognition 1998, pp. 338-345 proposes an approach for finding the boundary where the correspondence of a subset of boundary points using local shape features of a model is simultaneously determined. Statistical point models are constructed with shape and shape variation generated from sets of examples using principal component analysis of the covariance matrix. The model is then analysed in a Bayesian scheme to find shape parameters and pose parameters. The algorithm is used to locate the boundary of the lateral ventricles. Although the statistical point model is able to capture considerable variability for the lateral ventricular boundary, it is not easy to build the statistical model specific to all classes of the ventricular system. Furthermore, this approach is time consuming.

In 1998, as described in http://www-sig.enst.fr/tsi/groups/TII/active, a way of computing the correspondence between an MR volume and the atlas was proposed in which structural information (as flexible spatial constraints) was taken into account. The spatial constraints were formulated by the adoption of fuzzy set theory and information fusion theory. Segmentation approaches were not used globally but conditionally to regions of interest with imprecise limits. The calculation for correspondence between the MRI data and the atlas inferred a discrete deformation field constrained by object surfaces. Those recognised objects were relied upon to extract the whole ventricular system. This appears to be the first method (until 1998) to include the fourth ventricle. The aforementioned method needs to be validated on a large set of images and there does not appear to be any published information concerning its ability to distinguish the ventricles which would enable the method to be assessed. From the results presented, the algorithm does not appear to be able to extract the ventricular system accurately, or to maintain the connectivity automatically.

Sonka M, Tadikonda S K, Collins S M, "Knowledge-based interpretation of MR brain images," IEEE Transactions on Medical Imaging 1996, vol. 15, no. 4, pp. 443-452 describes a fully automated segmentation method to extract brain structures including the ventricular system from MR images. The algorithm is based on a hypothesize-and-verify principle and uses a genetic algorithm (GA) optimisation technique to generate and evaluate image interpretation hypotheses in a feedback loop. The algorithm is trained on 20 out of 28 MR brain images, with observer-defined contours of structures being used as prior knowledge and incorporated in the genetic algorithm (GA)-based image interpretation method. The method is tested on the remaining eight brain images, and can produce accurate labelling results of neuroanatomical structures. One limitation is that it can only handle brain with no gross anatomic abnormality. In addition, the manual identification of contours of neuroanatomical structures is tedious, time-consuming and vulnerable to inter-personal variations.

Holden M, Schnable J A, Hill D L G, "Quantifying small changes in brain ventricular volume using non-rigid registration," MICCAI 2001, pp. 49~56 describes the implementation of a non-rigid registration algorithm based on optimising normalised mutual information to extract the lateral ventricles from MR images. The algorithm uses a free-form deformation (FFD) to model local deformation, with the FFD being constructed from a 3D tensor product of B-splines, and deformation being achieved by translating control points in steps along the direction with maximum gradient until either the magnitude of the gradient is less than or equal to a threshold, or a pre-specified number of iterations is reached. By propagation, the algorithm maps the patient MR images with a generic atlas without the necessity for subject-specific segmentation. In this way, they first have a strong confidence in their model and then progressively take into account the additional information coming from the data itself. If the local refinements to be performed are small, the algorithm behaves well. However, if the patient's brain has been deformed too much, for example, due to high variability or disease, the model does not work well. The algorithm works best with images of normal subjects.

As described in http://www.mevis.de/projects/volumetry/volumetry.html, Center for Medical Diagnostic Systems and Visualisation, University of Bremen, Hahn et al developed a semiautomatic extracting and volumetric analysis algorithm of the cerebral ventricles from MR image. A few marks were manually defined as initial information for four cerebral ventricles and then the ventricular borders in 3D space were traced automatically by an algorithm that combined some concepts of classical transformation with a region fusion. The processing time was less than 1 second for a typical region of interest and the complete volumetric procedure can be performed in less than 5 minutes. Due to the complexity of the ventricle system and partial volume effect of MR images, the algorithm required a fine spatial resolution for the MR image data (for instance 0.5 mm). In addition to the human interaction for initial information, the algorithm is not able to maintain the connectivity automatically.

Lundervold A, Storvik G, "Segmentation of brain parenchyma and cerebrospinal fluid in multispectral magnetic resonance images," IEEE Transactions on Medical Imaging 1995, vol. 14, no. 2, pp. 339-349 describes a model-based segmentation method to extract, automatically, brain parenchyma and CSF in axial multispectral MR images. The algorithm incorporates information about anatomical boundaries and tissue signature using prior knowledge. One limitation of the algorithm is that it is restricted to slice images where the brain parenchyma and CSF spaces form connected regions.

DeCarli C, Horwitz B, "Method for quantification of brain volume from magnetic resonance images," USA patent US005262945A, 1993 describes a semi-automated method for regional analysis of brain, central and subarachnoid CSF volumes from MR images. The method is based on mathematical modelling of MR pixel intensity histograms. The histogram is modelled as a Gaussian allowing the application of standard statistical moments to pixel distribution.

All pixels for T2-weighted MR images are considered to be CSF when the intensity of the pixels is greater than (mean value−n*standard deviation) (where n is a constant to be set differently for different images as well as different brain structures). This is misleading because, in reality, one value of 'n' or an accurate threshold for separating the CSF from the brain matter signals is not enough owing to the partial volume effect and intensity inhomogeneity. In addition, it is difficult to locate, automatically, the threshold pixel intensity from the intersection of Gaussian fitting curves because the number of modals of the histogram of a ROI is difficult to determine.

Fisher E, Rudick R A, "Method and system for brain volume analysis," USA patent US006366797B1, 2002 describes a method for brain volume analysis from MRI images. Firstly, the brain is separated from other connected structures, and the brain surface contours are identified automatically. Then, the total volume within the brain surface contours is calculated. Fluid filled regions are thereby excluded and this accounts for the partial volume effect. The brain volume is then normalized by the total contour volume, and the brain parenchymal fraction is generated. The brain parenchymal fraction serves as a reliable measurement of brain atrophy and assists in determining the severity and progression of multiple sclerosis or other conditions. This quantification work develops a reliable method for automatic generation of a starting point for segmentation of cerebral structures, such as the lateral ventricles, by using active surfaces or deformable models, as described in Sturm B, Meier D, Fisher E, "Automated approximation of lateral ventricular shape in magnetic resonance images of multiple sclerosis patients," MICCAI 2002, pp. 483-491. However, this method it is too crude for ventricular volume analysis.

Brandt M E, "Method and apparatus for estimating tissue volumes in magnetic resonance images", USA patent US005425368A, 1995 describes a fuzzy approach to distinguish CSF, grey matter (GM), and white matter (WM) pixels in MR brain images. An unsupervised fuzzy clustering procedure based on a variation of the fuzzy c-means algorithm computes automatically the percentage area of each of these three compartments in each image. Although the approach does not assume any a priori statistical or heuristic model of the data, the method requires the input of the number of different compartments in the images and a parameter which determines the amount of overlap of compartment boundaries. Additionally, two or more different spectral channels of the same MR images are needed so as to get more accurate discrimination of tissue types. The approach requires about two minutes to analyse a single brain MR image to yield a decision on the percent of GM, WM, and CSF.

Gosche K M, "Method and system for knowledge guided hyperintensity detection and volumetric measurement," USA patent US006430430B1, 2002 describes an automated method and system for identifying suspected lesions in a multi-spectral dataset of the brain. The system applies a validity-guided clustering segmentation technique suitable for the discovery of small clusters to classify the varying pixel intensities into separate groupings, which potentially correspond to different tissue types. Then, the system refines the initial segmentation results into the separate groupings using one or more knowledge rules that combine pixel intensities with the spatial relationship of anatomical structures to locate one or more anatomical regions of the brain. Although the system uses one or more knowledge rules that combine pixel intensities with spatial relationship of anatomical structures to locate one or more anatomical regions of the brain, the system is suitable to detect brain lesion but not the ventricular system using multi-spectral MRI dataset.

Despite the numerous approaches proposed to solve the problem of extracting the human cerebral ventricular system, the above-described methods suffer from disadvantages and, as such, are not suitable for clinical use. This is due to the necessity for human intervention, the inability of these methods to handle pathological and abnormal cases, and/or the inability to extract the complete ventricular system. Moreover, the existing methods are too slow to be accepted clinically. Due to the anatomical complexity of the cerebral ventricular system and the lack of fast and reliable segmentation procedures, a fast, automatic, accurate, and robust method is desirable to extract the complete ventricular system.

The present invention is directed to ameliorating or overcoming the above problems of prior art methods.

SUMMARY OF THE INVENTION

According to a first aspect of the invention there is provided a method for extracting cerebral ventricular system information from images of one or more cerebral ventricular regions, the cerebral ventricular system comprising a third ventricle (V3), a fourth ventricle (V4), a left lateral ventricle (VLL) having a body (VLL-B) and an inferior (temporal) horn (VLL-I), a right lateral ventricle (VLR) having a body (VLR-B) and an inferior (temporal) horn (VLR-I), an anterior commissure (VAC), a posterior commissure (PC), and a midsagittal plane (MSP), the method comprising the steps of:
1) defining multiple regions of interest (ROI) in the images;
2) defining seed points within each ROI;
3) growing images of ventricular regions while correcting for leakages into extraventricular space; and
4) connecting the ventricular regions grown.

According to a second aspect of the invention there is provided an apparatus arranged to perform the above method. In a preferred embodiment, the apparatus is a computing apparatus.

According to a third aspect of the invention there is provided a computer program product comprising computer program instructions readable by a computer apparatus to cause the computer apparatus to perform the above-defined method.

According to a fourth aspect of the invention there is provided a method of quantifying the ventricular system by counting the number of voxels of the ventricular system extracted by a method as defined above and multiplying this count by voxel volume.

According to a preferred embodiment, the ventricular system is divided into six, three-dimensional (3D) regions: body of the left lateral ventricle, body of the right lateral ventricle, inferior horn of the left lateral ventricle, inferior horn of the right lateral ventricle, third ventricle, and fourth ventricle. Within each ventricular region, a suitable plane is selected and a region of interest (ROI) is defined on it based on anatomy and literature studies capturing variability of the ventricular system. Within this ROI, its statistics are calculated which characterize the distribution of radiological properties (intensities) of the image data. In this invention, numerous ROIs are placed in some well-defined locations to study locally the distribution of cerebrospinal fluid (CSF), grey matter (GM), and white matter (WM). This makes the algorithm more robust and flexible. If the required distribution in a considered ROI is not achieved, this ROI is adaptively reduced and the distribution is recalculated. As the algorithm handles explicitly the distribution of image data, this makes it applicable to extract the ventricles from any type of image data. This distribution is used subsequently for growing each ventricular region. When a leakage into the extraventricular space occurs during region growing, the growing conditions are tightened in terms of distribution, direction of growing, and space, and growing is repeated. Finally the ventricular regions grown are connected by relaxing, if necessary, the growing conditions and applying anatomical knowledge.

Further preferred features are defined in the dependent claims.

BRIEF DESCRIPTION OF THE DRAWINGS

Preferred embodiments of the present invention will now be described by way of example and with reference to the accompanying drawings in which:

FIG. 7 shows original and smoothed histograms of the intensity of matter in a region of interest;

FIG. 8 is a histogram of a multiple polyline fitting of the intensity histogram of FIG. 7 and an initial approximation of thresholds;

FIG. 9a is a radiological image showing the division of a third ventricle (V3) into subregions;

FIG. 9b is a radiological image showing the division of a fourth ventricle (V4) into subregions;

FIG. 11 is a radiological image showing how the connection between the body of a lateral right ventricle and inferior horn of the lateral right ventricle is achieved.

DETAILED DESCRIPTION OF PREFERRED EMBODIMENTS

1. Abbreviations Used in the Disclosure

The following abbreviations are used in the present specification:
AC—anterior commissure
PC—posterior commissure
MSP—midsagittal plane
VL—lateral ventricle
V3—third ventricle
V4—fourth ventricle
VLL—left lateral ventricle
VLR—right lateral ventricle
VLL-B—body of the left lateral ventricle (including the anterior and posterior horns)
VLR-B—body of the right lateral ventricle (including the anterior and posterior horns)
VLL-I—inferior (temporal) horn of the left lateral ventricle
VLR-I—inferior (temporal) horn of the right lateral ventricle
AC-PC—intercommissural (axial) plane passing through the AC and PC
VAC—coronal plane passing through the AC
VPC—coronal plane passing through the PC
CSF—cerebrospinal fluid
GM—grey matter
WM—white matter
ROI—two-dimensional region of interest
2D—two-dimensional (or two dimensions)
3D—three-dimensional (or three dimensions).

An embodiment of the present invention provides a fast, automatic, accurate, and robust method to extract the complete cerebral ventricular system of, for example, a human being, from radiological images. The steps constituting the method are shown in the flow diagram of FIG. 1. The processing of the method includes at least four steps. The method of the present invention will be discussed in more detail after a brief discussion of these steps.

Figure 1:
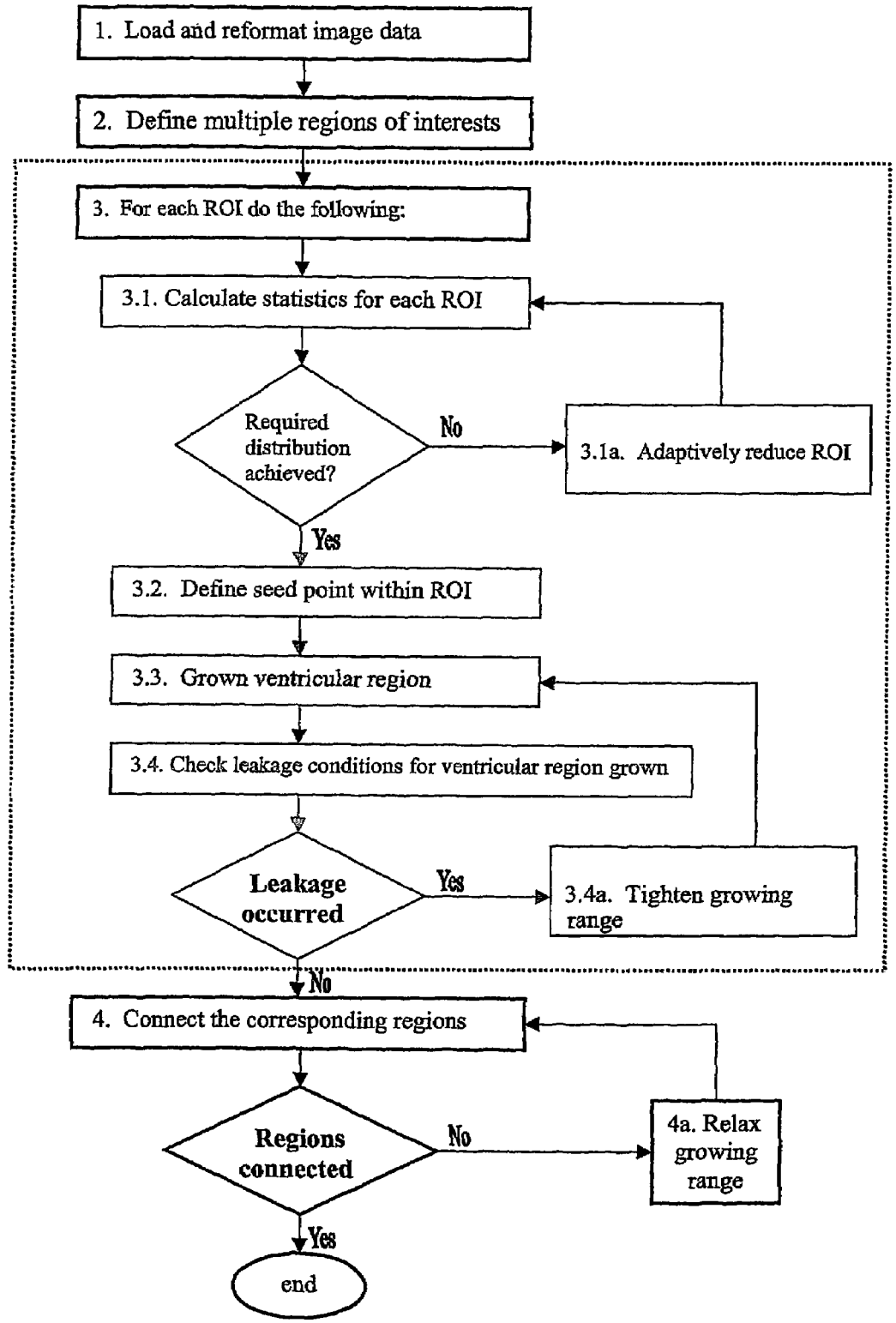
FIG. 1 is a flowchart showing the steps in an embodiment of a method according to the invention.

The processing steps, illustrated in the flow diagram of FIG. 1, are as follows:
1. The first step is to load and reformat the image data.
2. The second step is to define six 2D regions of interest (ROIs), each corresponding to one of the ventricular regions, VLL-B, VLR-B, VLL-I, VLR-I, V3, and V4.
3. The third step is, for each ROI, to:
   3.1 Calculate statistics, such as the distribution of image intensities (Step 3.1). If for a considered ROI the required distribution (for example, two or three identifiable peaks in the derived histogram) is not achieved, this ROI is reduced adaptively and the statistics recalculated (Step 3.1a). This process is repeated until the required distribution is achieved.

3.2 Define a seed point within the ROI (Step 3.2).

3.3 Grow a 3D ventricular region from this seed point (Step 3.3).

3.4 Check the occurrence of leakage for the ventricular region grown (Step 3.4). If leakage into the extraventricular space occurs, tighten the growing range in terms of spatial and radiological characteristics (Step 3.4a) and repeat growing this ventricular region.

4. The fourth step is to connect the regions grown: VLL-B with VLL-I, VLR-B with VLR-I, and V3 with V4 (Step 4). Should the corresponding regions not be connected, the growing range should be relaxed in terms of spatial and radiological characteristics and growing continued until connections are achieved (Step 4a).

FIGS. 2 to 5 show radiological images of a human cerebral ventricular system. The ventricular system is divided into six three-dimensional regions: the body of the left lateral ventricle 10, as shown in the radiological image of FIGS. 2 and 3, the body of the right lateral ventricle 12, as shown in the radiological image of FIGS. 2 and 3, the inferior horn of the left lateral ventricle (not shown), the inferior horn of the right lateral ventricle 14, as shown in the radiological image of FIG. 3, the third ventricle 16, as shown in the radiological image of FIG. 4, and the fourth ventricle 18, as shown in the radiological image of FIG. 5.

Within each ventricular region, a plane (either axial, sagittal, or coronal) is selected and a region of interest (ROI) is defined on the plane based on anatomy and literature studies regarding variability of the ventricular system. FIGS. 2 to 5 show ROIs for the different ventricles illustrated, as denoted by the reference numerals 20, 22, 24 and 26 respectively. Numerous ROIs are placed in well-defined locations to study locally the distribution of cerebrospinal fluid (CSF), grey matter (GM), and white matter (WM).

According to a preferred embodiment of the invention, within an ROI, its statistics are calculated which characterize the distribution of radiological properties (intensities) of the image data. FIGS. 6a, 6b, 7 and 8 illustrate various intensity distributions of CSF, GM and WM within an ROI. These are discussed in more detail below. If the required distribution (two or three identifiable peaks in the intensity histogram) in a considered ROI is not achieved, this ROI is adaptively reduced and the distribution is recalculated. This distribution is used subsequently for growing each ventricular region. When a leakage into the extraventricular space occurs during region growing, the growing conditions are tightened in terms of distribution, direction of growing, and space, and growing is repeated. Finally the ventricular regions grown are connected by relaxing, if necessary, the growing conditions and applying anatomical knowledge.

To facilitate region growing, the ventricular regions may be further subdivided into smaller subregions, as shown in FIGS. 9a and 9b and denoted by reference numerals 1, 2, 3 and 4. FIG. 9a shows the division of a third ventricle (V3) into subregions. V3 is divided into four subregions by the planes passing through AC and PC, namely VAC, VPC, AC-PC. The subregion 1 contains the most antero-ventral part of V3, separated from the rest by VAC and AC-PC planes. The subregion 2 contains the most dorsal part of V3, separated from the rest by AC-PC and VPC planes. The subregion 3 contains the most posterior part of V3, separated from the rest by AC-PC and VPC planes. The subregion 4 contains the most ventral part of V3, separated from the rest by AC-PC and VAC planes.

FIG. 9b shows the division of a fourth ventricle (V4) into subregions. V4 is divided into two subregions by an axial plane 30 passing through the point from which the growing takes place, namely the seed point. The subregion 1 includes the superior part of V4, and the subregion 2 includes the inferior part of V4.

Figure 10:
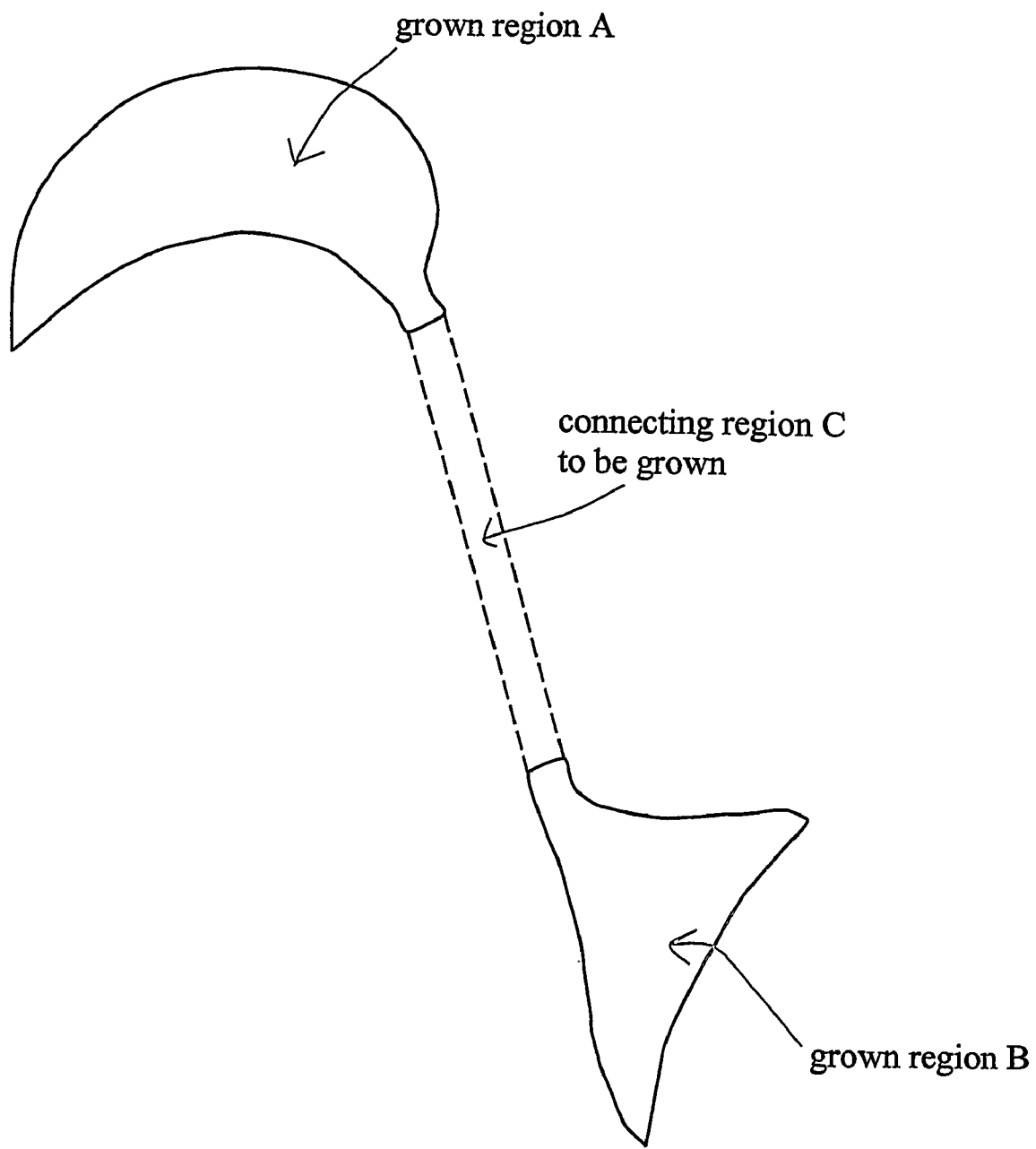
FIG. 10a is a schematic illustrating region connection in which first and second regions A and B are not connected through a third region C.
FIG. 10b is a schematic illustrating region connection of the three regions of FIG. 10a showing region growing with a relaxed range.
FIG. 10c is a schematic illustrating region connection between the regions A and B of FIG. 10b after they are grown towards each other following performance of the operations of FIG. 10b.
Figure 10:
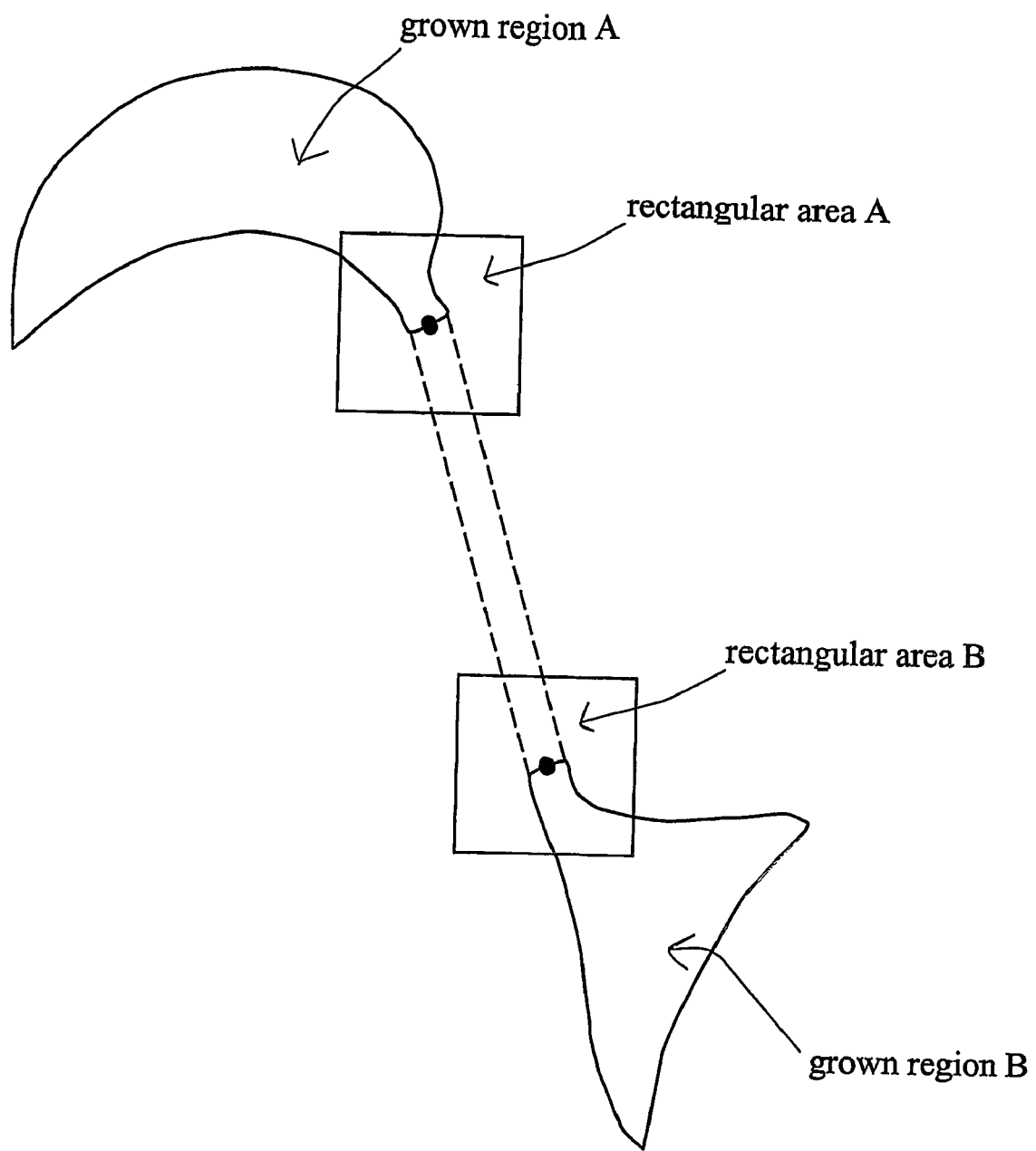
Figure 10C:
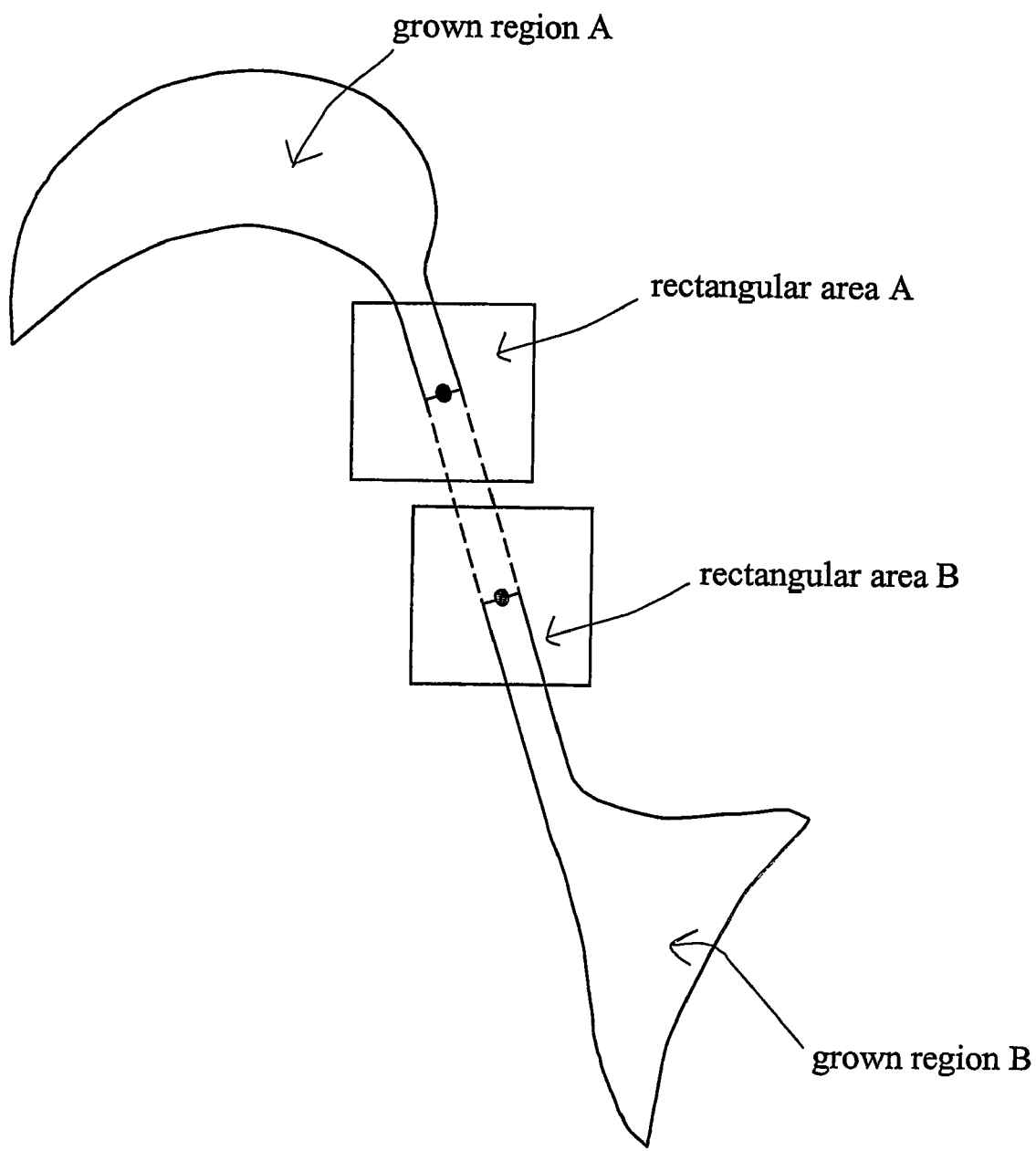

FIG. 10a shows region connection in which first and second regions A and B are not connected through a third region C. FIG. 10b illustrates region connection of the three regions of FIG. 10a. Local statistics are calculated in rectangular areas 32 at both ends of regions A and B, and region growing with a relaxed range is performed. FIG. 10c illustrates region connection in which both regions A and B are grown towards each other after performing operations specified in FIG. 10b, but regions A and B are still not connected. New rectangular areas 34 are set, statistics calculated within them, and the region growing is performed again.

FIG. 11 illustrates the connection between the body of a lateral right ventricle and inferior horn of the lateral right ventricle which is discussed in detail below.

2. Algorithm 2.1 STEP 1: Loading and Reformatting of Image Data

The image data of the brain are loaded first. It is assumed that the location of the MSP and the positions of the AC and PC are known. The location of the MSP may be calculated, for example, using the method described in International Patent Application No: PCT/SG02/00006 filed January 2002 in the names of Hu Q, and Nowinski W L, and entitled "Method and apparatus for determining symmetry in 2D and 3D images". The positions of the AC and PC may be calculated, for example, using the method described in International Patent Application No: PCT/SG00/00185 filed November 2000 in the names of Nowinski WL, and Thirunaruukarasuu A, and entitled "Methods and apparatus for processing medical images".

As the MSP, the AC and the PC are known, the image data of the brain are reformatted along the AC-PC plane, the MSP or the VAC such that axial, coronal, and sagittal orientations are available (Step 1 shown in FIG. 1). This permits the use of any orientation for setting an ROI and performing oriented region growing.

If the image data are acquired with low inter-slice resolution, for example, 5 mm or more, reformatting does little to assist in achieving a better accuracy of segmentation and quantification. In such an instance, reformatting should be carried out only to determine ROIs and several of the refinements and tests proposed below may not be applicable. However, region growing for all regions should be attempted in the acquisition orientation.

The low resolution case is an unusual situation and the accuracy of obtaining quantification of the ventricular system from low resolution data may be unreliable.

2.2 STEP 2: Define Multiple Regions of Interests (ROIs)

Six regions of interest (ROIs) are defined corresponding to the ventricular regions: VLL-B, VLR-B, VLL-I, VLR-I, V3, and V4, (Step 2, FIG. 1). The initial ROIs are defined taking into account the worst case assumption, that is, the biggest ROI necessary, based on literature studies.

2.2.1 ROIs for VLL-B and VLR-B

The ROIs are set on the coronal orientation as follows.
1. Select the VAC.
2. Set the initial rectangular ROI on the VAC:
   i) laterally between [MSP, MSP+25 mm] for VLL-B and [MSP-25 mm, MSP] for VLR-B, and
   ii) dorsally between [AC, AC+35 mm] (the sign "+" means in upper (dorsal) direction from the AC).
3. Refer to 2.3.2 below for the adaptive determination of ROI for subsequent processing.

Figure 2:
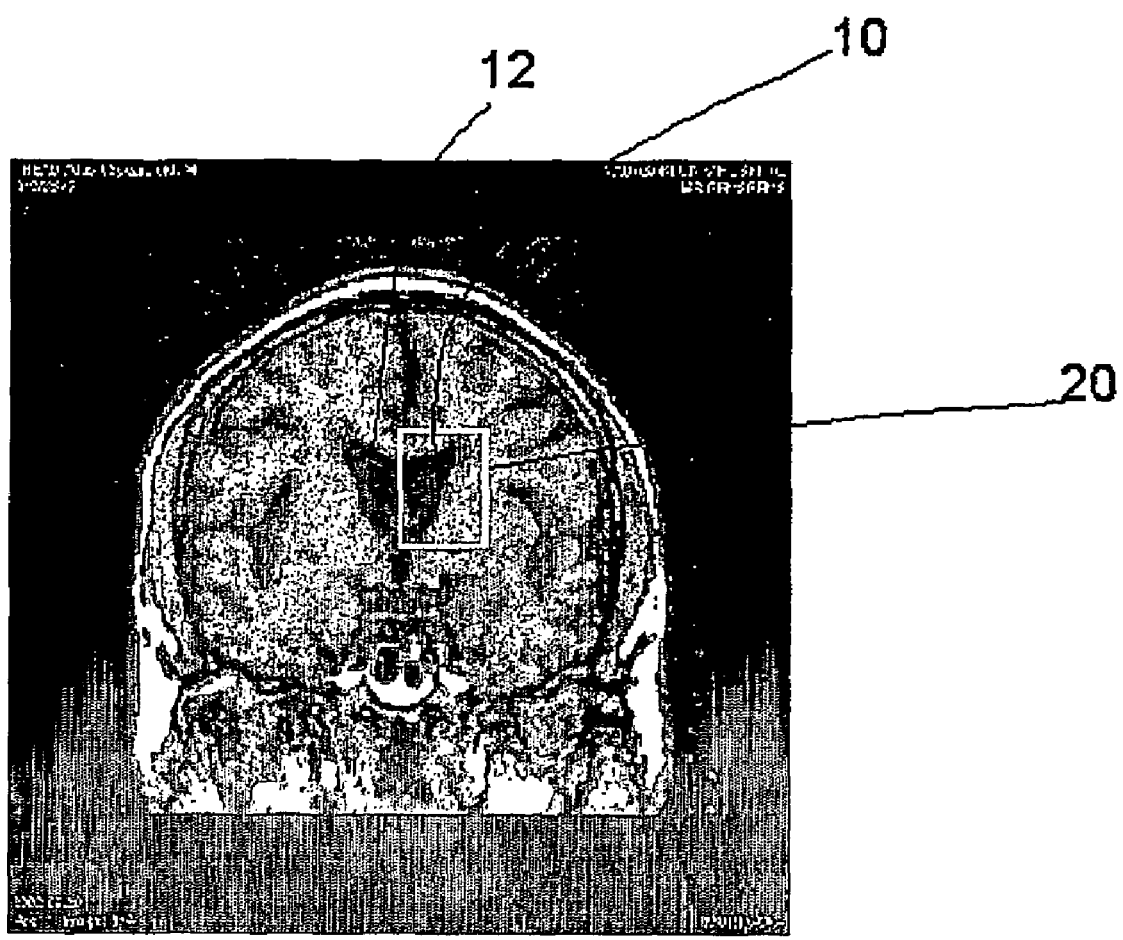
FIG. 2 is a radiological image showing a region of interest in a cerebral ventricle for calculating the radiological property distribution and seed point determination for the left lateral ventricle.
Figure 3:
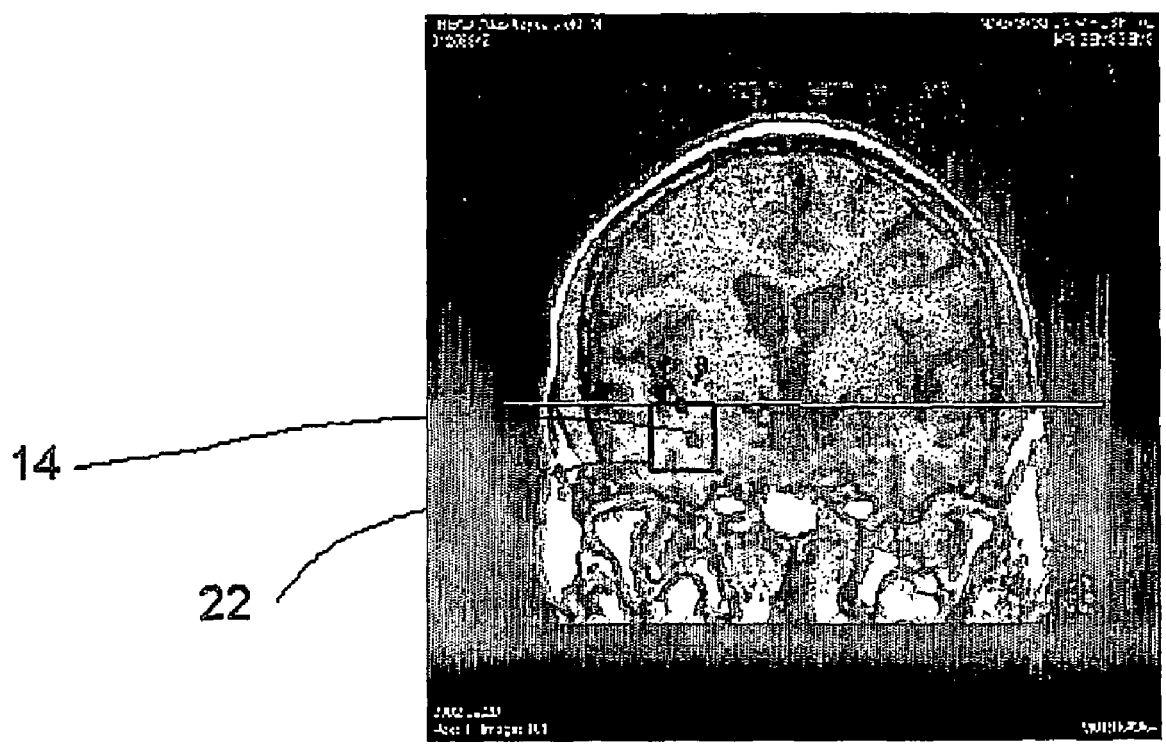
FIG. 3 is a radiological image showing a region of interest in a cerebral ventricle for seed point determination for the inferior (temporal) horn of the right lateral ventricle.

Both lateral ventricles (10 and 12 as shown in FIGS. 2 and 3) are very variable in shape and volume. The average volume is 7 ml but the volume may vary from around 2 to 39 ml. The estimates of the size of lateral ventricles 10 and 12 given in prior art literature are based on various techniques such as ventricular casts and pneumoencephalograms which may not be accurate. The left lateral ventricle 10 is slightly larger than the right ventricle 12 in most cases. The distance between the lateral margins of both ventricles at its minimum spread is typically 30 to 40 mm (see Radiology of the skull and brain, ventricles and cisterns. Eds: Newton T H and Potts D G. MediBooks, Great Neck, N.Y., pp. 3494-3537). Thus, the minimal distance between the MSP and the lateral edge of either of the lateral ventricles is around 15 to 20 mm, so the lateral ROI range of MSP to MSP+25 mentioned above would appear to be justified as it encloses the lateral boundary of the lateral ventricles.

Although the height of the ROI is not generally available in the prior art literature, it can be calculated from the method of Jirout [see Robertson EG. Pneumoencephalography, ed. 2, Springfield Ill. 1967, Thomas C C, Publisher]. The height of the lateral ventricles can be determined and is typically around 32 to 34 mm (if angle (the angle between the tangents drawn along the superomedial and inferolateral walls of lateral ventricles in coronal plane) is in the range 20° to 25°) Thus, a height of AC+35 would also appear to be justified.

2.2.2 ROIs for VLL-I and VLR-I

The temporal horns are very variable. The maximum spread of the terminal (most ventral) points is around 57 mm and the width of the temporal horns is around 15 to 20 mm. They curve medially as they progress posteriorly and the maximum spread is around 73 to 90 mm at the maximum convexity [see Radiology of the skull and brain, ventricles and cisterns. Eds: Newton T H and Potts D G. MediBooks, Great Neck, N.Y., pp. 3494-3537].

The ROIs 20 and 22, as illustrated in FIGS. 2 and 3 are set on the coronal orientation as follows:
1. Select all the coronal slices between the VAC and the VPC.
2. The ratio of spread of the anterior parts of the temporal horns to that of the width of the skull is 0.55 according to Radiology of the skull and brain, ventricles and cisterns. Eds: Newton T H and Potts D G. MediBooks, Great Neck, N.Y., pp. 3494-3537. Draw the horizontal profile at the level of the inferior point of V3. Identify the temporal bone signal in the profile as the lateral-most high signal due to the bone marrow fat and measure the distance from this to the MSP. Divide this distance in half and consider this as point "a". This point should be in the vicinity of the ventral part of the temporal horn. Draw the ROI 20 mm×20 mm in reference to this point so that the coordinates are (a, a−10) (a, a+10) laterally and (a, a−20) ventrally (inferiorly), [see FIG. 3].
3. Keep unchanged the ROI for all subsequent processed slices.

2.2.3 ROI for V3

Figure 4:
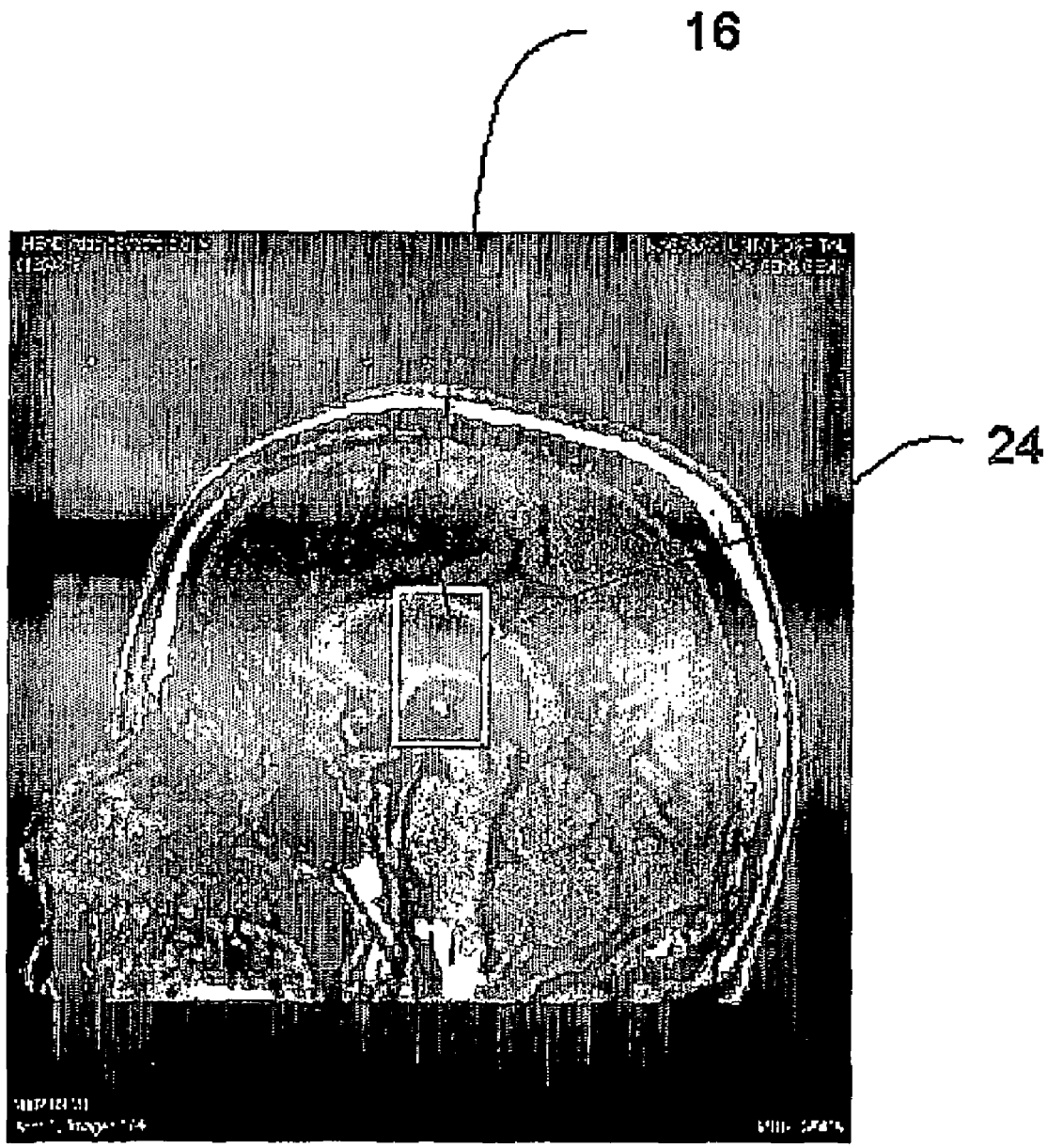
FIG. 4 is a radiological image showing a region of interest in a cerebral ventricle for calculating the radiological property distribution and seed point determination for the third ventricle.

The ROI 22 for V3, as illustrated in FIG. 4, is set on the sagittal orientation as follows.
1. Select the MSP.
2. Set the initial rectangular ROI: antero-posteriorly between [AC, PC] and dorsally between [AC−10 mm, AC+35 mm], [see FIG. 4].
3. Refer to 2.3.2 below for the adaptive determination of ROI for subsequent processing.

2.2.4 ROI for V4

Figure 5:
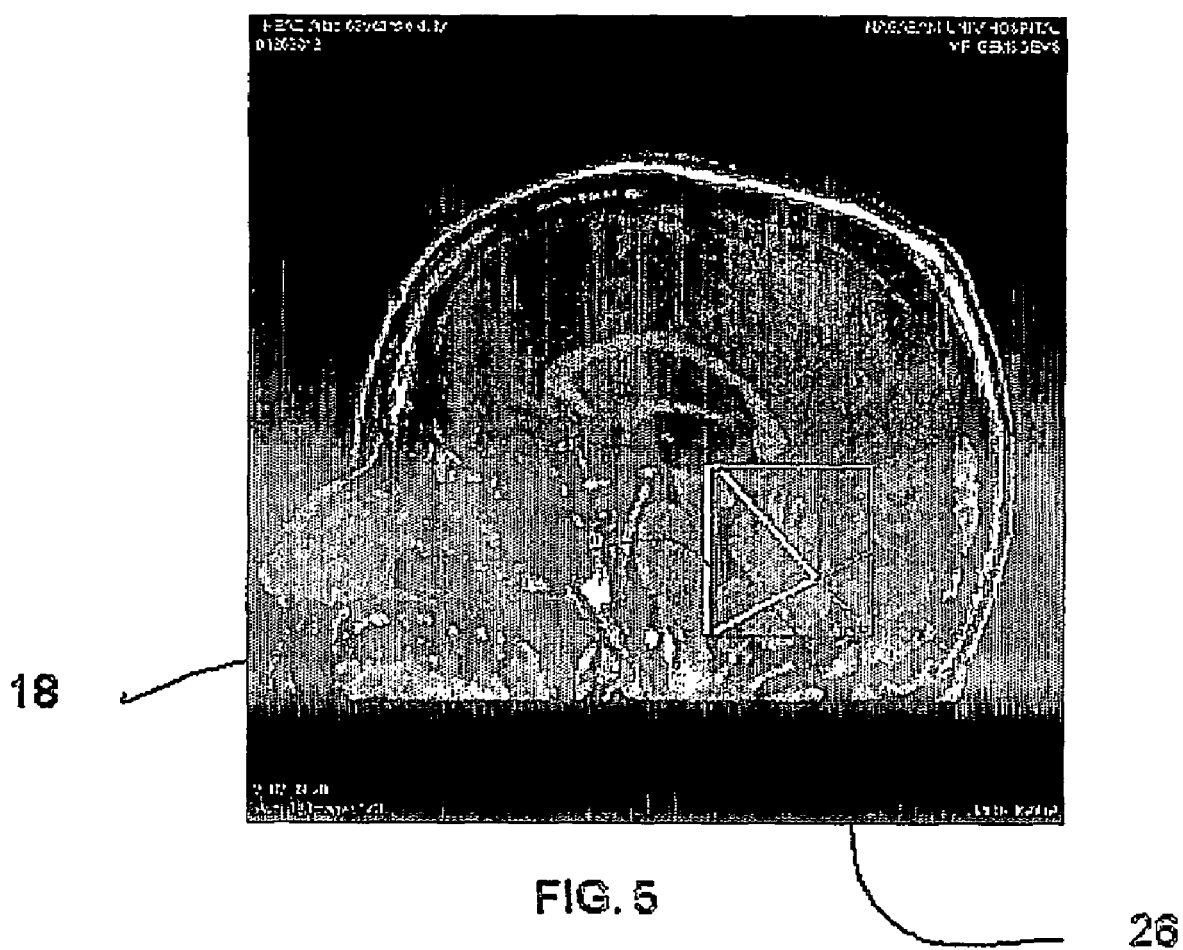
FIG. 5 is a radiological image showing a region of interest in a cerebral ventricle for calculating the radiological property distribution and seed point determination for the fourth ventricle.

Initially a large ROI 26 is used for V4, as illustrated in FIG. 5. The length of aqueduct is taken to be around 12 to 18 mm, and the length of floor of V4 as around 29 mm and its height as around 20 mm maximum according to Radiology of the skull and brain, ventricles and cisterns. Eds: Newton T H and Potts D G. MediBooks, Great Neck, N.Y., pp. 3494-3537. V4 is similar in shape to a ridged tent, that is, it has a base having a rectangular peripheral outline and sloping sides extending therefrom to an apex pointing at the fastigium posterosuperiorly. This is shown in FIG. 5. This ROI may include the clivus (bone), the ambient cistern, quadrigeminal cistern, and cisterna magna. These undesirable structures can be excluded if the ROI is made triangular and an apex pointing at the fastigium posterosuperiorly.

The ROI is set on the sagittal orientation as follows:
1. Select the MSP.
2. Set the rectangular region:
   i) posteriorly between [PC, PC+50 mm] (the sign '+' means in posterior direction with respect to the PC), and
   ii) dorsally between [PC, PC−45 mm] (the sign '−' means in ventral direction with respect to the PC).
3. Limit the superoposterior part of the ROI by drawing a line starting at 5 mm posterior to the PC to the posteroinferior corner of the ROI to bisect the ROI obliquely.
4. Limit the inferoposterior part of the ROI by drawing the line from the inferoanterior corner of the ROI to the midpoint of the posterior limit of the ROI. This will change the original square ROI into a pentagon with a base facing anteriorly and its apex roughly corresponding to the apex of V4 [see FIG. 5].
5. Refer to 2.3.2 below for the adaptive determination of ROI for subsequent processing.

2.3 STEP 3—Calculate Statistics for Each ROI

Figure 6A:
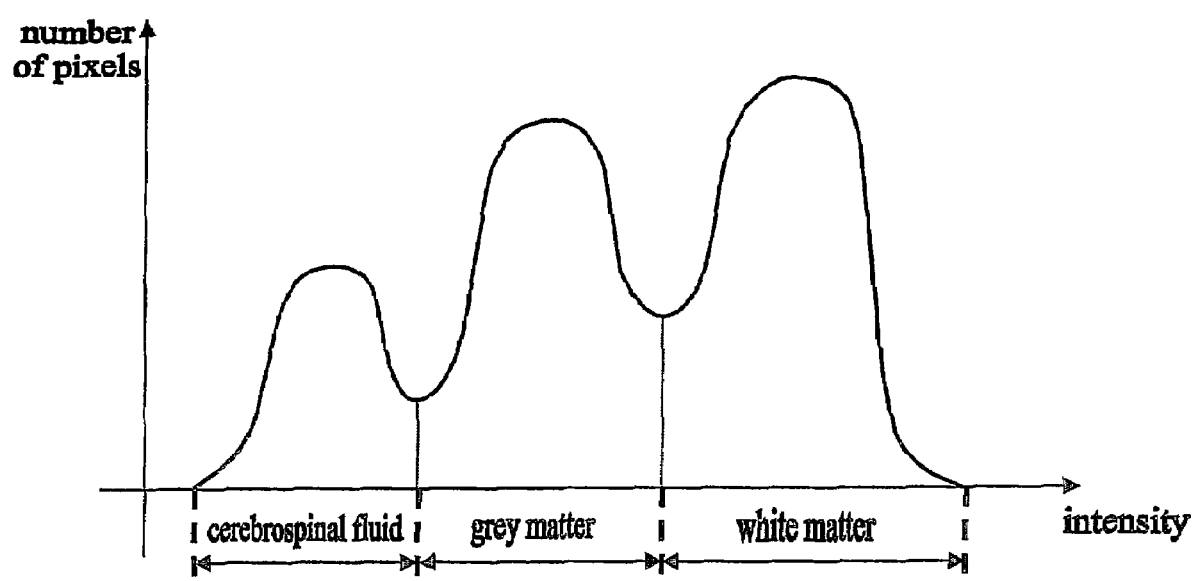
FIG. 6a is a histogram illustrating the ideal intensity distribution of cerebrospinal fluid (CSF), grey matter (GM), and white matter (WM) within a region of interest.
Figure 6:
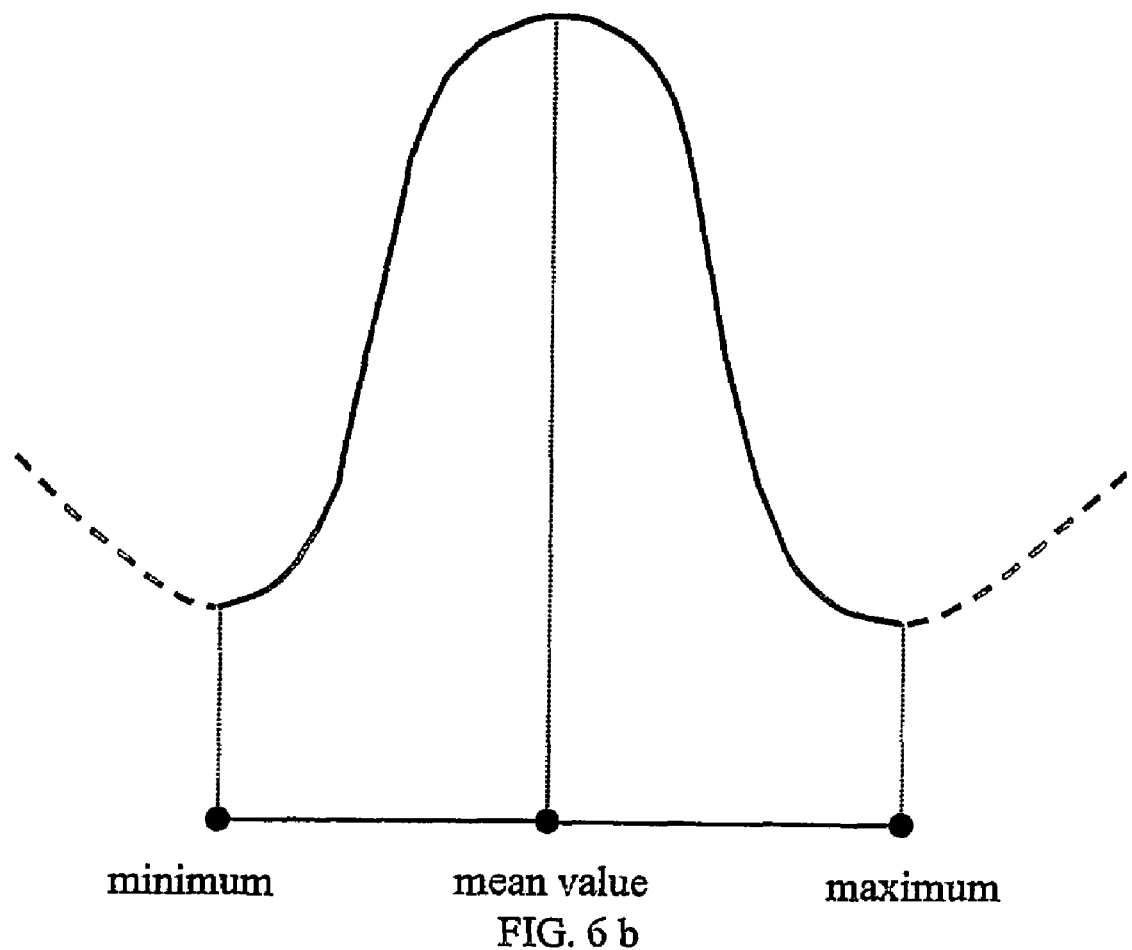
FIG. 6b is a part of the histogram of FIG. 6a showing the minimum, mean, and maximum values of intensity for a considered component.

The calculated statistics characterize the distribution of intensities in the studied region of interest. The initial ROIs 20, 22, 24 and 26 are chosen such that each contains three components: CSF, GM, and WM, (Step 3.1, FIG. 1). For a considered ROI, its histogram is calculated and the gray level ranges of CSF, GM, and WM are determined, as illustrated in FIG. 6*a*. For each component, three values are calculated: mean, minimum and maximum, as shown in FIG. 6*b*. The minimum and maximum values correspond to valleys while the mean values correspond to the peaks in the histogram. Histograms of real data have substantial local variations, which hampers determination of global peaks and valleys. Therefore, some initial smoothing can be applied and intensity distribution approximated, for instance, by employing 1) triangular, 2) polyline or 3) Gaussian approximations.

2.3.1 Histogram Processing

Each ROI 20, 22, 24 and 26 is defined to facilitate analysis that will produce statistically significant findings necessary for ventricular system extraction. FIG. 7 shows the histogram obtained from an ROI containing the lateral ventricles and adjacent structures. This is designed to produce a multimodal histogram where the intensity peaks can be chosen, corresponding to WM, GM, CSF (and other classes, if necessary). The ventricles are defined by those spatially connected pixels with an intensity between two thresholds, so called intensity thresholds, as described below.

There are five steps to determine the intensity thresholds from histogram peaks and valleys:
1) calculating a specific histogram of ROI;
2) smoothing the histogram;
3) identifying the peaks in the histogram;
4) determining the peaks corresponding to intensity values of CSF, GM, and WM using neuroanatomical knowledge; and
5) determining the thresholds.

FIG. 7 shows the original and smoothed histograms. The smoothed histogram is obtained by applying Fourier Transformation to the original histogram. The following constraints are imposed to exclude undesirable peaks:
1. A peak is ignored if its area is small compared to the cumulative area of the histogram (i.e., if its area is less than, for example, $\frac{1}{30}^{th}$ of the total area)
2. A peak is ignored if it is between the intensities at, for example, 5% and 95% of the cumulative area of the histogram.

After finding all of the peaks in the histogram, neuroanatomical and radiological knowledge is incorporated to locate the peaks corresponding to CSF, GM, and WM (for example, it is assumed that the highest intensity peak corresponds to WM on T1-weighted MRI while the lowest intensity peak corresponds to CSF).

Most existing methods calculate the CSF-GM threshold by taking the average of the two peaks corresponding to CSF and GM, and calculate GM-WM thresholds by taking the average intensity of the peaks corresponding to GM and WM. In this invention, the initial thresholds are approximated using polyline or Gaussian fitting. The initial thresholds are approximated by polyline fitting of the histogram illustrated as follows:

Smooth the histogram of ROI, as shown by line 1 in FIG. 8.

In the smoothed histogram, locate the positions of peaks and valleys, and connect the peaks and valleys sequentially, as shown by line 2 in FIG. 8 (first polyline fitting).

For each line segment of the first polyline fitting, locate the furthest point from the smoothed histogram to this line segment.

Connect all the peaks, valleys, and the furthest points of the smoothed histogram, as shown by line 3 in FIG. 8 (second polyline fitting).

Locate the peaks or intensity values corresponding to CSF and WM guided by neuroanatomical and radiological knowledge (i.e., it is assumed that the highest intensity peak is of WM on T1-weighted MRI. The lowest intensity peak is of CSF).

Locate the previous furthest point and the next furthest point for the peaks of CSF and WM on the second polyline fitting. These points are the initial thresholds for CSF-GM, GM-WM, and so on, and correspond to the vertical lines shown in FIG. 8.

These initial thresholds will be changed adaptively during the growing of the ventricular system to cope with the partial volume effect and intensity inhomogeneity.

2.3.2. Reduce ROI Adaptively

As the initial ROIs 20, 22, 24 and 26 are defined based on the worst case prior art literature variability studies, the distribution of CSF, GM, and WM may be unbalanced, in some cases, (meaning that some peaks corresponding to either WM, GM or CSF are so small that they are not easily identifiable in the histogram). This may hinder an accurate processing of the histogram. To improve the density distribution balance, the ROI is reduced adaptively. When the ratio of the WM/GM to CSF peak is greater than a given number (4, for example), the ROI is reduced by a given percentage (20%, for example), and the histogram is recalculated. The adaptive reduction of ROI is performed iteratively until the required distribution is achieved (Step 3.1a, FIG. 1).

For the ROIs corresponding to VLL-B and VLR-B, the aspect ratio is kept constant, and the ROIs are reduced from the lateral and dorsal sides. The ROI 24 corresponding to V3 is reduced from the superior side. The ROI 26 corresponding to V4 is reduced from the posterior side only. The ROIs corresponding to VLL-I and VLR-I are not used for statistics calculations and consequently remain unchanged (see 2.4.2 below).

2.4 Define Seed Point within ROI

A single seed point is defined within each ROI (Step 3.2, FIG. 1) and the region growing starts from this seed point.

2.4.1 Seed Points for VLL-B and VLR-B

Each of the seed points for VLL-B and VLR-B is defined as follows:
1. Sample the intensity of the ROI horizontally, for example every 5 mm starting from AC+10 mm.
2. Calculate a profile along each sample line segment. To increase the robustness, the averaged profile with, for example, two additional lines passing one pixel below and one pixel above is used.
3. Find the longest CSF segment from the averaged profile and place the seed point, for example, in the middle of this segment.

2.4.2 Seed Points for VLL-I and VLR-I

The exact position of the right coronal plane containing the ROI with respect to the reference planes (VAC, VPC, and AC-PC plane) is unknown. Therefore, the ROI defined in 2.2.2 above is movable and it is set on multiple coronal planes between the VAC and the VPC. Planes are selected and processed starting from the VAC posteriorly. The CSF region on the coronal slice between the VAC and the VPC with the largest CSF region is located. As the statistics are not known in this ROI, the VLL-B statistics with the CSF range are used for VLL-I and that of VLR-B for VLR-I. The seed point is placed at the geometric center of this largest CSF region.

2.4.3 Seed Point for V3

The seed point for V3 is defined as follows:
1) Calculate a profile along the AC-PC line.
2) Determine a pixel on the AC-PC line segment, whose gray level is closest to the CSF mean value, and take it as the seed point.

2.4.4 Seed Point for V4

The seed point for V4 is defined as follows:
1. Sample the intensity of the ROI horizontally, every 2 mm, as described in 2.2.4 above, starting for example, from PC-10 mm.
2. Calculate a profile along each sample line segment (to increase the robustness, several lines, 3 for example, can be used to obtain the averaged profile as in 2.4.1 above).

3. Calculate the length of the CSF in each averaged profile and compare the length to the previous one. When this length starts decreasing for at least two subsequent line segments, take, for example, the middle of the longest CSF segment as the seed point.

2.5 Grow Each Ventricular Region

The ventricular regions are grown in 3D independently starting from the defined seed points (Step 3.3, FIG. 1). Region growing is directional which allows for better control of growing in 3D space.

Let m be the minimum, M the maximum and the mean values of the C§F range calculated in Step 3.1. By using the complete range of intensities [m, M], the region grown may be overestimated because of the partial volume effect. Let s be a scaling factor between 0 and 1. Region growing can then be better controlled by using the following growing range [−s*(−m), +s*(M−)] with a variable value of s. For s=0, only the mean value of CSF is used for growing. For s=1, the full range of CSF is utilized. For s=0, the region grown may be underestimated while for s=1 it may be overestimated. The value of s has to be selected based on quantitative assessment.

To facilitate region growing, the ventricular regions are further subdivided into smaller subregions, as illustrated in FIGS. 9a and 9b. This approach has several advantages, namely:

- Region growing is simplified as complex shapes are replaced by simpler ones.
- Easier control regarding growing and connecting.
- Better leakage control, as it is easier to incorporate specific domain knowledge in each subregion.
- Processing is more efficient as only a subregion needs to be regrown in case of leakage.
- Facilitated reduction of the partial volume effect, as it is easier to incorporate specific domain knowledge in each subregion.
- Easier to adjust the initial thresholds tailored to the local anatomy.

2.5.1 Growing of VLL-B and VLR-B

Each of the VLL-B and the VLR-B regions is grown in 3D space on coronal slices, slice by slice. Growing is initiated anteriorly from the seed point located on the VAC. When this growing is completed, it is continued posteriorly on all subsequent coronal slices. Eventually, it is continued anteriorly when attempting to extract the posterior part of the inferior horn.

2.5.2 Growing of VLL-I and VLR-I

Each of the VLL-I and the VLR-I regions is grown in 3D space on coronal slices, slice by slice. Growing is initiated anteriorily from the seed point. When this is completed, growing is continued posteriorly on subsequent coronal slices.

2.5.3 Growing of V3

V3 is divided into four subregions by the planes passing through the AC and the PC, namely the VAC, the VPC, and the AC-PC, as shown in FIG. 9a. The subregion 1 contains the most antero-ventral part of V3, separated from the rest by the VAC and the AC-PC planes. The subregion 2 contains the most dorsal part of V3, separated from the rest by the AC-PC and the VPC planes. The subregion 3 contains the most posterior part of V3, separated from the rest by the AC-PC and the VPC planes. The subregion 4 contains the most ventral part of V3, separated from the rest by the AC-PC and the VAC planes.

V3 is grown in 3D as follows. Subregion 2 is grown dorsally and subregion 4 is grown ventrally on axial slices starting from the seed point. Subregion 1 is grown anteriorly on coronal slices starting from any pixel common with subregion 4. Subregion 3 is grown dorsally on axial slices starting from any pixel common with subregion 2.

2.5.4 Growing V4

V4 is subdivided into two subregions by the axial plane passing through the seed point, as shown in FIG. 9b. Subregion 1 includes the superior part of V4 and subregion 2 includes the inferior part of V4.

V4 is grown on axial slices, dorsally in subregion 1 and ventrally in subregion 2 starting from the axial slice containing the seed point.

2.6 Leakage Conditions for Each Region Grown

The foreground region is formed by all pixels belonging to the extracted ventricular system. The remaining pixels, i.e., those not belonging to the ventricular system, form the background region.

First the leakage has to be detected. Leakage in various areas behaves in different ways so a single algorithm does not work for all the regions. Anatomically there is no sudden change in the size of the ventricular system except in specified places. Therefore, when a region is grown on a given slice it is compared with the previous slice and any increase in size more than, for example 50%, can be considered a leakage. If the width of V3 is, for example, 4 mm in one slice and if it exceeds, for example, 6 mm (50%) in the subsequent slice then leakage is considered to have occurred. At other locations, a grown region can be considered leakage if it is grown to an area that is not anatomically correct.

2.6.1 Anti-Leakage Conditions

A region grown may "leak" beyond the ventricular space into the extraventricular space. Two groups of conditions are formulated to deal with this problem: 1) leakage detection conditions and 2) leakage control conditions. These conditions are based on domain knowledge (anatomy and variability studies), radiological properties (intensity ranges), geometrical constraints, direction of growing, and size and location of the grown region.

2.6.2 VLL-B and VLR-B Leakages

Leakage may occur in a posterior ventral part of the body of lateral ventricles. Moreover, in some cases, a large cystic elongated space between the lateral ventricles may be present representing the cavum septum pellucidum and cavum vergae. A potential leakage to this space has to be checked as well. This can be checked on radiological images as the cavum is relatively perpendicular and predictable, and the septal wall can be easily detected (it has higher signal intensity as compared to CSF on T1-weighted images). For the leakage into the quadrigeminal cistern, any growth of a region below the PC, in the area behind the VPC up to the seed point of V4, can be considered as leakage.

2.6.3 VLL-I and VLR-I Leakages

The following leakages may occur in these regions: 1) inferomedially through the hippocampus to the interpeduncular cistern, 2) medially through white matter (optic radiation) and cortex (choroidal fissure) to the subarachnoid space. Suitable spatial constraints are imposed for leakage prevention. This is described in more detail in 2.6.6.2 below.

2.6.4 V3 Leakages

The following leakages may occur in V3: 1) anteriorly through the lamina terminalis to the chiasmatic cistern, 2) ventrally through the mesencephalic tegmentum to the interpeduncular cistern, 3) posteriorly through the posterior commissure (stalk of the pineal body) to the cisterna ambiens. A leakage is considered to have occurred when the number of extracted pixels in the current slice is, for example, 50% more than that in the previous slice.

2.6.5 V4 Leakages

The following leakages may occur in V4: 1) dorsoposteriorly through the superior medullary velum to the cisterna ambiens, 2) ventroposteriorly through the inferior medullary velum to the cisterna magna. A leakage is considered to have occurred when the number of extracted pixels in the current slice is, for example, 50% more than that in the previous slice.

2.6.6 Tighten Growing Range

When the leakage occurs, the region growing has to be repeated with tightened growing ranges. The range can be narrowed from intensity and spatial points of view.

By decreasing the value of the scaling factor s, the growing range of intensity $[-s^*(-m), +s^*(M-)]$ is narrowed. The tightening is done iteratively (Step 3.4a) by decreasing the value of s (for example by 5% starting from s=0.9), followed by performing the region growing again and checking whether the leakage is avoided.

When the increase in the number of extracted pixels from a slice exceeds the number from the previous slice by, for example, more than 50%, it can be considered that leakage has occurred. When this happens, growing is tightened iteratively by decreasing the scaling factor s. This process is repeated till the increase in the number of extracted pixels in a slice does not exceed that of the previous slice by, for example, more than 50%. Alternatively, growing may be tightened iteratively by decreasing the CSF-GM threshold ranges. This process is repeated till the increase in number of extracted pixels is less than, for example, 50% in the subsequent slice. Spatially, if leakage has occurred, a bounding box is decreased as follows to confine the growing.

2.6.6.1 VLL-B and VLR-B

Leakage may occur in the quadrigeminal cistern of the body of lateral ventricles behind the VPC up to the seed point of V4. The growing will not be allowed below the PC in ventral direction.

2.6.6.2 VLL-I and VLR-I

To prevent potential leakages, the foreground region(s) on a processed coronal slice is (are) not allowed to grow beyond the boundary of ROI for VLL-I or VLR-I.

2.6.6.3 V3

As the shape of the roof of V3 is oblique, the distance between the superior and inferior pixels of the foreground region decreases along the anterior direction. In order to prevent the potential leakage ventrally through the mesencephalic tegmentum to the interpeduncular cistern, the width of the foreground region of subregion 1 on a processed coronal slice is not allowed to increase by, for example, more than 50% of the width of the previous slice along the anterior direction.

To prevent leakage posteriorly through the PC (stalk of the pineal body) to the cisterna ambiens, two spatial constraints are imposed:

The maximum width of the foreground region of subregion 3 on a currently processed axial slice is on the PC line (the PC line is the intersection between the VPC and the current axial slice).

The distance between the gravity centre of the foreground region of subregion 3 and the MSP should be small, for instance less than 4 mm [see Radiology of the skull and brain, ventricles and cisterns. Eds: Newton T H and Potts D G. MediBooks, Great Neck, N.Y., pp. 3494-3537].

2.6.6.4 V4

To prevent leakage dorsoposteriorly through the superior medullary velum to the cisterna ambiens, two constraints are imposed:

The number of the foreground pixels of the current axial slice should not increase by, for example, more than 50% over that in the previous slice in the inferior direction.

The distance between the gravity centre of the foreground region and the MSP should be less than, for example, 2 mm. The gravity centre of the foreground region should not deviate, for example, more than 2 mm away from that of the previous slice.

To prevent the leakage ventroposteriorly through the inferior medullary velum to the cisterna magna, the width of the foreground region at the lateral recesses should be less than, for example, 2 mm [see Radiology of the skull and brain, ventricles and cisterns. Eds: Newton T H and Potts D G. MediBooks, Great Neck, N.Y., pp. 3494-3537].

2.7 STEP 4—Connect the corresponding grown regions

The ventricular regions grown, VLL-B, VLR-B, VLL-I, VLR-I, V3, and V4 may, generally, not be connected as the CSF regions between them are quite narrow and the partial volume effect, noise, and low image resolution may prohibit growing through them.

The algorithm first checks whether the corresponding ventricular regions are connected. If not, the growing conditions are relaxed, and region growing is attempted, see as an example, FIGS. 10a, 10b and 10c. These steps are repeated to achieve the desired connection. If the regions cannot be connected through relaxing the growing conditions (i.e., based on radiological properties), (fine) anatomical knowledge is incorporated to ensure connection. If the regions still cannot be connected, brute-force conditions (based on crude anatomical knowledge) are applied.

2.7.1 Growing Region Under Relaxed Conditions

The gray level ranges are relaxed by increasing the value of s (for example by 5% starting from s=0.5) in the intensity range determined by the formula $[-s^*(-m), +s^*(M-)]$. This concept is illustrated in FIGS. 10a, 10b and 10c. To deal with the partial volume effect, the value of s can be greater than 1.

Region growing under relaxed conditions is applied to the following situations:

Connect the extracted regions of the ventricular system,

Segment regions with intensity inhomogeneity, i.e., subregion 2 of V4,

Extract the narrow parts of the lateral ventricle, i.e., the posterior horn.

2.7.2 Connect VLL-B with VLL-I and VLR-B with VLR-I

The detailed steps to ensure connection between VLR-B and VLR-I are set out below. This connection is performed in the coronal direction. The connection between VLL-B and VLL-I is achieved in a similar way.

When growing in the posterior direction, the following steps are involved:

1. Locate the leftmost inferior pixel $P_1$ of the VLR-B.
2. Grow VLR-I on a current coronal slice in the posterior direction. The current coronal slice is denoted $C_{cur}$. Check whether the number of foreground regions is equal to or less than 1. If not, go to '3' below. If yes, Find the minimum rectangular area containing all the foreground pixels of the previous coronal slice in the anterior direction.

Copy the rectangular area to the current coronal slice.

Find a seed point for the grey matter at the rectangular area and extract the grey matter through region growing. If the seed point cannot be found or if the grey matter is absent, go to step '6' below for a brute-force connection.

Trace the leftmost superior boundary of the grey matter. Add the traced pixels to the grown region, and go to step '4' below.

3. Check whether the number of foreground region(s) is more than 1 on $C_{cur}$. If not, go to step '4' below. If yes, connect the foreground regions by the following steps:

Locate the $P_2$ and $P_3$ pixels on the foreground regions, where $P_2$ is the leftmost inferior pixel of the upper foreground region and $P_3$ is the leftmost superior pixel of the lower foreground region, as shown in FIG. 11.

Trace the boundary of the grey matter between $P_2$ and $P_3$. Add the traced pixels to the grown region.

4. Check whether the current grown region is connected with the grown region on the previous coronal slice in anterior direction. If not, connect them.

5. Check whether $P_1$ is on the current coronal slice. If not, go to step '2' above. If yes, terminate the current connection process.

6. The brute-force connection is enforced when either the seed point is not found or the grey matter is absent. Form a fan-type layer from $P_1$ and the last grown region to complete the connection.

2.7.3 Connect V3 and V4—Extraction of Aqueduct

In most cases, the aqueduct, that is, the connection structure between V3 and V4 cannot be extracted directly as its diameter is quite small (about 1.2 mm). After finishing segmentation of V3 and subregion 1 of V4, the extraction of the aqueduct is done in the superior direction as follows:

1. Locate the superior aqueduct starting pixel ($Q_1$) at the most posteroinferior part of V3. Locate the most superior pixel of subregion 1 of V4 ($Q_2$), FIG. 10b. The axial slice with $Q_2$ is called reference slice, $A_R$. The following assumptions are made when locating the superior aqueduct start pixel ($Q_1$):

Its location is inferior to PC.
   Its location is at the most postero-ventral part of V3.
   It is located near the MSP.

2. Check whether $Q_1$ and $Q_2$ are spatially connected or the same. If yes, V3 is connected with V4, and the current connection is terminated.

3. Determine a rectangular area around a pixel (described below) on the axial slice next to $A_R$ in superior direction.

The intersection of the line connecting $Q_1$ and $Q_2$ with the axial plane in the superior direction is called the intersection pixel (IP).

The half height of the rectangle in the anterior-posterior direction equals to the distance between IP and $Q_2$.

The half width of the rectangle in the left-right direction is equal to the distance between $Q_2$ and the geometric centre of the foreground region on the axial slice next to $A_R$ in inferior direction.

4. Grow region on the axial slice next to $A_R$ in superior direction. The aqueduct can be positioned at the lowest intensity in the search area on T1-weighted MR image (or the highest on T2-weighted images). If the number of pixels grown is zero, go to step 7 to force the connection.

5. Check whether the grown region connects with subregion 1 of V4. If not, connect the grown region with the subregion 1 of V4.

6. Add the grown region into subregion 1 of V4. Assign the current axial slice as the reference slice $A_R$. Locate the IP of grown region as $Q_2$, go to step 2.

7. For the brute-force connection, take the IP in each axial slice as aqueduct.

Ensuring connections (if they do not exist) between the lateral ventricles with the third ventricle (through the foramina of Monroe) may not be necessary, as these foramina open temporarily under the increasing pressure of CSF and close again. Therefore, the algorithm does not provide any additional means to ensure these connections automatically. The decision on ensuring these connections can be made interactively by the user of the algorithm, and the procedure is conceptually similar to that for providing the connection between V3 and V4.

In summary, an embodiment of the present invention is directed to a method and apparatus for extracting the human cerebral ventricular system using a combination of neuroanatomy, radiological properties, variability of the ventricular system taken from literature, and image processing techniques used for extraction. The embodiments of the invention enable any type of image data to be processed and provide a rapid, robust, and accurate means for the extraction of the complete ventricular system using a fully automatic method.

Various modifications to the methods described above will be apparent to those skilled in the art, for example, whilst the present invention has been described above in connection with the extraction of the cerebral ventricular system for a human being, it will be appreciated that the methods could be applicable to animals, as animal brains also have a similar morphology and the ventricular system is even comparatively larger in lower animals.

The invention claimed is:

1. A method for extracting cerebral ventricular system information from images of one or more cerebral ventricular regions, the method comprising the steps of:

1) defining multiple regions of interest (ROIs) in the images, at least one of the images having multiple ROIs defined within;
   2) altering the ROIs based on desired histogram distribution within the ROIs;
   3) defining seed points within each ROI;
   4) growing images of ventricular regions in 3D space while correcting for leakages into extraventricular space; and
   5) connecting the ventricular regions grown;

wherein:
   the steps are executed by a computing apparatus, and the steps of defining multiple ROIs, defining seed points and growing images are applied to one or more images of a left lateral ventricle (VLL), a right lateral ventricle (VLR), a third ventricle (V3), a forth ventricle (V4), an anterior commissure (AC), a posterior commissure (PC), and a midsagittal (MSP); the left lateral ventricle (VLL) having a body (VLL-B) and an inferior (temporal) horn (VLL-I), and the right lateral ventricle (VLR) having a body (VLR-B) and an inferior (temporal) horn (VLR-I), each ROI is defined by a two-dimensional area encompassing a ventricle with surrounding white and grey matter, and at least one of said ROIs corresponding to the fourth ventricle.

2. The method according to claim 1, wherein the steps of defining multiple ROIs, defining seed points and growing images are applied first to one or more images of the third ventricle (V3), then to one or more images of the fourth ventricle (V4), and then to the left and right lateral ventricles (VLL and VLR) for controlling leakage and connections.

3. The method according to claim 1, wherein the method is performed from one or more medical imaging modalities.

4. The method according to claim 1, wherein the step of defining multiple ROIs comprises defining each ROI in a predetermined plane.

5. The method according to claim 4, wherein the step of defining multiple ROIs comprises selecting said predetermined plane to be on a coronal orientation to constitute a coronal slice.

6. The method according to claim 5, wherein the step of selecting said predetermined plane to be on the coronal orientation for assessment of an image of the body of the left lateral ventricle or the body of the right lateral ventricle comprises the steps:
  (1) selecting the coronal plane (VAC) passing through the anterior commissure (AC);
  (2) selecting the initial rectangular ROI on the VAC laterally between the coordinates [MSP, MSP+n1] for the body of the left lateral ventricle, and [MSP-n1, MSP] for the body of the right lateral ventricle, and dorsally between [AC, AC +n2), where n1 and n2 are constants; and
  (3) altering the ROIs for subsequent processing based on desired histogram distribution within the ROIs.

7. The method according to claim 6, wherein the aspect ratio of each ROI is constant.

8. The method according to claim 7, wherein the sizes of the ROIs are reduced laterally and dorsally.

9. The method according to claim 6, wherein n1 is 25 mm.

10. The method according to claim 6, wherein n2 is 35 mm.

11. The method according to claim 5, wherein the images of the one or more cerebral ventricular regions comprises one or more coronal slices comprised of pixels, and wherein the step of selecting said predetermined plane to be on a coronal orientation for assessment of an image of the inferior horn of the left lateral ventricle (VLL-I) or the inferior horn of the right lateral ventricle (VLR-I) comprises the steps:
  1) selecting coronal slices between the coronal plane passing through the anterior commissure (VAC) and the coronal plane passing through the posterior commissure (VPC);
  2) drawing a horizontal profile at the level of the inferior pixel of the image of the third ventricle(V3);
  3) identifying the temporal bone signal in the horizontal profile as the lateral-most high signal due to bone marrow fat;
  4) measuring the distance from the temporal bone to the midsagittal plane (MSP);
  5) dividing the distance in half to define a midpoint and considering this midpoint as point "a";
  6) drawing an ROI having the dimensions n6×n6 in reference to the midpoint "a" so that the coordinates are (a, a−n7 (a, a+n7) laterally and (a, a+n6) inferiorly, where n6 and n7 are constants; and
  7) maintaining the ROIs for subsequent processing unchanged.

12. The method according to claim 11, wherein n6 is 20 mm.

13. The method according to claim 11, wherein n7 is 10 mm.

14. The method according to claim 1 wherein the ROI for the third ventricle (V3) is set on a sagittal plane by:
  1) selecting the midsagittal plane (MSP);
  2) setting an initial rectangular ROI antero-posteriorly between the coordinates [AC, PC] and dorsally between [AC−n8, AC +n9], wherein n8 and n9 are constants; and
  3) altering the ROIs for subsequent processing based on desired histogram distribution within the ROIs.

15. The method according to claim 14, wherein the sizes of the ROIs are reduced by moving the superior boundary of the ROI inferiorly.

16. The method according to claim 14, wherein n8 is 10 mm.

17. The method according to claim 14, wherein n9 is 35 mm.

18. The method according to claim 1 wherein the ROI for the fourth ventricle (V4) is set on a sagittal plane by:
  1) selecting the midsagittal plane (MSP);
  2) setting a rectangular ROI posteriorly between [PC, PC +n10] and dorsally between [PC, PC−n11], where n10 and n11 are constants;
  3) limiting the superoposterior part of the ROI by drawing a line starting at n12 posterior to PC to the posteroinferior corner of the ROI to bisect the ROI obliquely, where n12 is a constant;
  4) limiting the inferoposterior part of the ROI by drawing the line from the inferoanterior corner of the ROI to the midpoint of the posterior limit of the ROI; and
  5) altering the ROIs for subsequent processing based on desired histogram distribution within the ROIs.

19. The method according to claim 18, wherein the sizes of the ROIs are reduced posteriorly.

20. The method according to claim 18, wherein n10 is 50 mm.

21. The method according to claim 18, wherein n11 is 45 mm.

22. The method according to claim 18, wherein n12 is 5 mm.

23. The method according to claim 18, wherein the desired histogram distribution within said ROIs the peaks corresponding to white matter (WM), grey matter (GM), and cerebrospinal fluid (CSF) in said histogram are identifiable with any existing peak detection algorithm.

24. The method according to claim 1, wherein the step of defining seed points within an ROI for VLL-B and VLR-B comprises the steps:
  1) sampling the ROI horizontally, starting from AC+n13 every n14 distance, where n13 and n14 are constants to form sample line segments;
  2) calculating a profile along each sample line segment;
  3) determining the longest CSF segment from said profile; and
  4) placing the seed point in the middle of the segment.

25. The method according to claim 24, wherein n13 is 10 mm.

26. The method according to claim 24, wherein n14 is 5 mm.

27. The method according to claim 11, wherein the step of defining seed points for VLL-I and VLR-I comprises the following steps:
  1) setting the ROIs for the VLL-I and VLR-I on multiple coronal planes between VAC and VPC, wherein the planes are selected and processed starting from VAC;
  2) locating the CSF region on the coronal slice between VAC and VPC having the largest CSF region; and
  3) placing the seed point at the geometric centre of said CSF region.

28. The method according to claim 18, wherein the step of defining the seed point for V3 comprises the steps:
  1) calculating a profile along the line between the anterior and posterior commissures (AC-PC); and 2) determining a pixel on the AC-PC line, whose gray level is closest to the CSF mean value to constitute the seed point.

29. The method according to claim 18, wherein the step of defining the seed point for V4 comprises the steps:
 1) sampling the ROI horizontally, starting from PC-n15 every n16 distance, where n15 and n16 are constants to generate a sample line segment;
 2) calculating a profile along each sample line segment;
 3) calculating the length of the CSF in each profile and comparing the calculated length to the previous one; and
 4) when the calculated length decreases for at least n17 subsequent slices, select the middle of the longest CSF segment as the seed point, where n17 is any constant.

30. The method according to claim 29, wherein n15 is 10 mm.

31. The method according to claim 29, wherein n16 is 2 mm.

32. The method according to claim 29, wherein n17 is 2 mm.

33. The method according to claim 1, wherein each lateral ventricle is grown in 3D space on coronal slices, slice by slice.

34. The method according to claim 33, wherein the step of growing the image of the third ventricle V3 comprises:
 1) subdividing V3 into four subregions 1, 2, 3 and 4 by the planes passing VAC, VPC, AC-PC, subregion 1 containing the most anterior part of V3 and being separated from subregions 2, 3 and 4 by the VAC and the AC-PC planes, subregion 2 containing the most dorsal part of V3 and being separated from the subregions 1, 3 and 4 by the AC-PC and the VPC planes, subregion 3 containing the most posterior part of V3 and being separated from subregions 1, 2 and 4 by the AC-PC and the VPC planes, and subregion 4 containing the most ventral part of V3 and being separated from the subregions 1, 2, and 3 by the AC-PC and the VAC planes; and
 2) growing V3 in three dimensions, wherein subregion 1 is grown anteriorly on coronal slices, subregion 2 and subregion 3 are grown superiorly on axial slices; and subregion 4 is grown inferiorly on axial slices from the seed point.

35. The method according to claim 33, wherein the step of growing the image of the fourth ventricle (V4) comprises:
 1) subdividing V4 into two subregions 1, and 2, by the axial plane passing through the seed point, subregion 1 including the part of V4 superior to and subregion 2 including the part inferior to the axial plane; and
 2) growing V4 on axial slices, dorsally in subregion 1 and ventrally in subregion 2 starting from the axial slice containing the seed point.

36. The method according to claim 33, wherein during the growth of the VLL-B and VLR-B regions, the step of correcting for leakages in the extraventicular region comprising the quadrigeminal cistern comprises inhibiting growing of a region below the PC in inferior direction.

37. The method according to claim 36, wherein the leakage comprises growth in the area behind the VPC up to the seed point of V4.

38. The method according to claim 36, wherein during the growth of the VLL-I and VLR-I regions, the step of correcting for leakages comprises inhibiting the anterior boundaries on the coronal slice to connect with the boundary of the ROI of VLL-I (or VLR-I).

39. The method according to claim 34, wherein during the growth of the V3 region the step of correcting for leakages ventrally through the mesencephalic tegmentum to the interpeduncular cistern, comprises:
 hindering the width of the foreground region of subregion 1 on a coronal slice from increasing by more than 50% of the width of the previous slice along anterior direction.

40. The method according to claim 34, wherein during the growth of the V3 region the step of correcting for leakages posteriorly through the PC (stalk of the pineal body) to the cisterna ambiens, comprises:
 1) limiting the maximum width of foreground region of subregion 3 on an axial slice to be on PC line; and
 2) maintaining the distance between the centre of gravity of the foreground region of subregion 3 and the MSP less than n18, where n18 is a predetermined constant.

41. The method according to claim 40, wherein n18 is 4 mm.

42. The method according to claim 35, wherein during the growth of the V4 region the step of correcting for leakages dorsoposteriorly through the superior medullary velum to the cisterna ambiens, comprises:
 1) hindering the number of foreground pixels of the current axial slice from increasing by 50% more than that in the previous slice in the inferior direction; and
 2) maintaining the distance between the centre of gravity of the foreground region of V4 and the MSP less than 2 mm.

43. The method according to claim 35, wherein during the growth of the V4 region the step of correcting for leakages ventroposteriorly through the inferior medullary velum to the cisterna magna, comprises maintaining the width of the foreground region of V4 at the lateral recesses less than 2 mm.

44. The method according to claim 34, further comprising repeating the region growing with narrower growing ranges after detection of leakage.

45. The method according to claim 44, wherein the step of repeating the region growing with narrower growing ranges comprises narrowing the intensity range and/or the spatial range of the growing region.

46. The method according to claim 45, wherein the narrowing of the intensity range comprises decreasing the value of the scaling factor s, in the equation defining the growing range of intensity $[\mu-s^*(\mu-tm), \mu+s^*(M-\mu)]$, wherein m is the minimum, M the maximum and $\mu$ the mean values of the CSF range and s is a scaling factor between 0 and 1.

47. The method according to claim 46 wherein the narrowing of the intensity range is performed iteratively by decreasing the value of s, followed by performing the region growing again and checking whether the leakage is avoided.

48. A method for extracting cerebral ventricular system information from images of one or more cerebral ventricular regions, the cerebral ventricular system comprising a third ventricle (V3), a fourth ventricle (V4) a left lateral ventricle (VLL) having a body (VLL-B) and an inferior (temporal) horn (VLL-I), a right lateral ventricle (VLR) having a body (VLR-B) and an inferior (temporal) horn (VLR-I), an anterior commissure (AC), a posterior commissure (PC), and a midsagittal (MSP), the method comprising:
 A) defining multiple regions of interest (ROI) in the images;
 B) defining seed points within each ROI;
 C) growing images of ventricular regions while correcting for leakages into extraventricular space; and
 D) connecting the ventricular regions grown;
wherein the step of connecting the ventricular regions VLL-B and VLL-I comprises:
 1) locating the leftmost inferior pixel of [VLR-B, $P_1$] where $P_1$ is the left most inferior pixel of VLR-B;
 2) growing VLR-I on a coronal slice in a posterior direction;

3) checking whether the number of foreground region is equal to or less than 1; if not, go to 4); if yes,
   find the minimum rectangular area containing all the foreground pixels of the previous coronal slice in anterior direction;
   pass the rectangular area to the current coronal slice $C_{cur}$;
   find a seed point for the grey matter at the rectangular area, and extract the grey matter through region growing; if the seed point cannot be found or the grey matter is absent, go to 7) for brute-force connection;
   trace the leftmost superior boundary of the grey matter;
   add the traced pixels to the grown region, and go to 5);
4) checking whether the number of foreground region(s) is more than 1 on $C_{cur}$; if not, go to 5); if yes, connect the foreground regions by the following steps:
   locate the $P_2$ and $P_3$ pixels on the foreground regions, where $P_2$ is the leftmost inferior pixel of the upper foreground region and $P_3$ is the leftmost superior pixel of the lower foreground region;
   trace the boundary of the grey matter between $P_2$ and $P_3$; and
   add the traced pixels to the grown region;
5) checking whether the current grown region is connected with the grown region on the previous coronal slice in anterior direction; if not, connect them;
6) checking whether $P_1$ is on the current coronal slice; if not, go to 2); if yes, terminate the current connection process;
7) enforcing the brute-force connection when either the seed point is not found or the grey matter is absent; and
8) forming a cone from $P_1$ and the last grown region to complete the connection.

49. A method for extracting cerebral ventricular system information from images of one or more cerebral ventricular regions, the cerebral ventricular system comprising a third ventricle (V3), a fourth ventricle (V4), a left lateral ventricle (VLL) having a body (VLL-B) and an inferior (temporal) horn (VLL-I), a right lateral ventricle (VLR) having a body (VLR-B) and an inferior (temporal) horn (VLR-I), an anterior commissure (AC), a posterior commissure (PC), and a mid-sagittal (MSP), the method comprising the steps of:
   A) defining multiple regions of interest (ROI) in the images;
   B) defining seed points within each ROI;
   C) growing images of ventricular regions while correcting for leakages into extraventricular space; and
   D) connecting the ventricular regions grown;
wherein the step of connecting the ventricular regions V3 and V4 after finishing segmentation of V3 and the subregion 1 of V4 comprises:
   1) extracting the connection in the superior direction by:
      (a) locating the superior connection starting pixel ($Q_1$) at the posterior inferior part of V3; and
      (b) locating the most superior pixel of subregion 1 of V4 ($Q_2$) assuming the location is inferior to the PC, is at the most posterior inferior part of V3 and is nearest to the MSP;
   2) checking whether $Q_1$ and $Q_2$ have the same location; if yes, V3 is connected with V4, and the current connection is terminated;
   3) if no, determining a rectangular area around a pixel on the axial slice next to the reference slice $A_R$ in the superior direction, the reference slice $A_r$ being the axial slice with $Q_2$;
   4) growing a region on the axial slice next to $A_R$ in superior direction; if the number of pixels grown is zero, go to 7) to force the connection;
   5) checking whether the grown region connects with the subregion 1 of V4; if not, connect the grown region with the subregion 1 of V4;
   6) adding the grown region into subregion 1 of V4; assigning the current axial slice as the reference slice $A_R$; locate the intersection pixel (IP) of the line connecting $Q_1$ and $Q_2$ with the axial plane in the superior direction of the grown region and make $Q_2$, the IP, then go to 2); and
   7) applying a brute-force connection, by considering the IP in each axial slice as the connection.

50. An apparatus arranged to perform a method according to claim 1.

51. An apparatus according to claim 50, wherein the apparatus is a computing apparatus.

52. A method of quantifying the ventricular system by counting the number of voxels of the ventricular system extracted by a method as claimed in claim 1 and multiplying this count by voxel volume.

53. A method for extracting cerebral ventricular system information from images of one or more cerebral ventricular regions, the method comprising the steps of:
   1) defining multiple regions of interest (ROIs) in the images, at least one of the images having multiple said ROIs defined within;
   2) altering said ROIs based on desired histogram distribution within the ROIs;
   3) defining seed points within each ROI;
   4) growing images of ventricular regions in 3D space while correcting for leakages into extraventricular space; and
   5) connecting the ventricular regions grown;
wherein:
   the steps are executed by a computing apparatus, and the steps of defining multiple ROIs, defining seed points and growing images are applied to one or more images of a left lateral ventricle (VLL), a right lateral ventricle (VLR), a third ventricle (V3) and a fourth ventricle (V4), the left lateral ventricle (VLL) having a body (VLL-B) and an inferior (temporal) horn (VLL-I), and the right lateral ventricle (VLR) having a body (VLR-B) and an inferior (temporal) horn (VLR-I);
   each ROI is defined by a two-dimensional area encompassing a ventricle with surrounding white and grey matter; and
   the ROIs correspond respectively to the third ventricle (V3), the fourth ventricle (V4), the left lateral ventricle (VLL) and right lateral ventricle (VLR).

* * * * *

UNITED STATES PATENT AND TRADEMARK OFFICE
CERTIFICATE OF CORRECTION

PATENT NO.       : 7,756,306 B2
APPLICATION NO.  : 10/547441
DATED            : July 13, 2010
INVENTOR(S)      : Wieslaw Lucjan Nowinski It is certified that error appears in the above-identified patent and that said Letters Patent is hereby corrected as shown below:

IN THE CLAIMS:

Claim 1, Line 23, Col. 20, Line 60, delete "corresponding" and insert --corresponds-- therefor;

Claim 6, Line 5, Col. 21, Line 16, after "(AC);" insert --and--;

Claim 6, Line 8, Col. 21, Line 21, delete "[AC, AC+n2)," and insert --[AC, AC+n2],-- therefor;

Claim 6, Line 9, Col. 21, Lines 21-24, delete "constants; and (3) altering the ROIs for subsequent processing based on desire histogram distribution within the ROIs." and insert --constant.-- therefor;

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,756,306 B2
APPLICATION NO. : 10/547441
DATED : July 13, 2010
INVENTOR(S) : Wieslaw Lucjan Nowinski Page 1 of 1

It is certified that error appears in the above-identified patent and that said Letters Patent is hereby corrected as shown below:

IN THE CLAIMS:

Claim 1, Line 23, Col. 20, Line 60, delete "corresponding" and insert --corresponds-- therefor;

Claim 6, Line 5, Col. 21, Line 16, after "(AC);" insert --and--;

Claim 6, Line 8, Col. 21, Line 21, delete "[AC, AC+n2),"  and insert --[AC, AC+n2],-- therefor;

Claim 6, Line 9, Col. 21, Lines 21-24, delete "constants; and (3) altering the ROIs for subsequent processing based on desire histogram distribution within the ROIs." and insert --constant.-- therefor;

Claim 18, Line 1, Col. 22, Line 22, delete "the line" and insert --a line-- therefor;

Claim 34, Line 3, Col. 23, Line 25, delete "V3into" and insert --V3 into-- therefor;

Claim 48, Line 3, Col. 24, Line 50, delete "(V4)" and insert --(V4),-- therefor;

Claim 49, Line 15, Col. 26, Line 6, delete "$A_r$" and insert --$A_R$-- therefor; and Claim 51, Line 1, Col. 26, Line 24, delete "An" and insert --The-- therefor.

This certificate supersedes the Certificate of Correction issued November 16, 2010.

Signed and Sealed this
Fifteenth Day of February, 2011

David J. Kappos
*Director of the United States Patent and Trademark Office*